US008866434B2

(12) United States Patent
Jones et al.

(10) Patent No.: US 8,866,434 B2
(45) Date of Patent: Oct. 21, 2014

(54) SYSTEM AND METHOD FOR CONTROLLING A TURBINE BLADE

(75) Inventors: Stephen P. Jones, Cecil, PA (US); Alan Duane Cleland, Prospect, PA (US); Paul John Rowan, Pittsburgh, PA (US)

(73) Assignee: Windurance LLC, Coraopolis, PA (US)

( * ) Notice: Subject to any disclaimer, the term of this patent is extended or adjusted under 35 U.S.C. 154(b) by 913 days.

(21) Appl. No.: 12/740,465

(22) PCT Filed: Oct. 31, 2008

(86) PCT No.: PCT/US2008/012366
§ 371 (c)(1),
(2), (4) Date: Sep. 28, 2010

(87) PCT Pub. No.: WO2009/058357
PCT Pub. Date: May 7, 2009

(65) Prior Publication Data
US 2011/0046802 A1    Feb. 24, 2011

Related U.S. Application Data

(60) Provisional application No. 61/001,443, filed on Nov. 1, 2007.

(51) Int. Cl.
*H02P 27/00* (2006.01)
*G05D 17/00* (2006.01)
*H02P 9/04* (2006.01)
*F03B 7/00* (2006.01)
*F01D 7/00* (2006.01)
*F03D 7/02* (2006.01)
*F03D 7/04* (2006.01)

(52) U.S. Cl.
CPC ............ *F03D 7/0264* (2013.01); *F03D 7/0224* (2013.01); *Y02E 10/723* (2013.01); *F03D 7/042* (2013.01); *F05B 2210/16* (2013.01); *F05B 2270/107* (2013.01)

USPC ............... 318/721; 700/297; 290/44; 416/11; 416/26; 416/30; 416/98

(58) Field of Classification Search
CPC ............................. H02P 25/023; H02P 25/021
USPC ......... 318/721; 700/287; 290/44; 416/11, 26, 416/30, 98
See application file for complete search history.

(56) References Cited

U.S. PATENT DOCUMENTS 2,766,833 A    10/1956 Lowry et al.
5,183,387 A    2/1993 Huggett et al.
(Continued)

FOREIGN PATENT DOCUMENTS

EP    1286048    2/2003
GB    2071781    9/1981
WO    2005021962    3/2005

*Primary Examiner* — Eduardo Colon Santana
*Assistant Examiner* — Gabriel Agared
(74) *Attorney, Agent, or Firm* — Simpson & Simpson, PLLC

(57) ABSTRACT

A control system for a turbine blade, including: an operational control element for generating and outputting an operational control signal, the operational control signal for non-emergency operation of a motor for controlling pitch of the turbine blade; an emergency control element, separate from and different from the operational control element, for generating and outputting an emergency control signal for emergency operation of the motor; and, an output stage element for receiving the operational and emergency control signals and for selecting one of the operational or emergency control signals, and with a means for receiving power for operation of the motor and with a means for providing the received power to the motor according to the selected operational or emergency control signal.

13 Claims, 20 Drawing Sheets

(56) References Cited

U.S. PATENT DOCUMENTS

| | | | |
|---|---|---|---|
| 5,779,446 A * | 7/1998 | Althof et al. | 416/36 |
| 2006/0083615 A1* | 4/2006 | Rogall et al. | 416/98 |
| 2007/0267872 A1* | 11/2007 | Menke | 290/44 |
| 2007/0267873 A1* | 11/2007 | Teichmann | 290/44 |
| 2009/0058086 A1* | 3/2009 | Arinaga et al. | 290/44 |
| 2010/0127494 A1* | 5/2010 | Garmendia Olarreaga et al. | 290/44 |

\* cited by examiner

SYSTEM AND METHOD FOR CONTROLLING A TURBINE BLADE

CROSS-REFERENCE TO RELATED APPLICATIONS

This application claims the benefit of International Application No. PCT/US2008/012366, filed Oct. 31, 2008 which claims the benefit under 35 U.S.C. §119(e) of U.S. Provisional Application No. 61/001,443 filed on Nov. 1, 2007 which applications are incorporated herein by reference.

FIELD OF THE INVENTION

The present invention relates to wind or water turbines having one or more blades and, in particular, to electrical actuation of the pitch angle of the blades. More specifically, the present invention relates to emergency control of the pitch angle for the blades.

BACKGROUND OF THE INVENTION

Dynamic control of blade pitch angle is used on turbines as part of an overall control system to regulate rotor speed and torque. Techniques are also employed to adjust blades to mitigate a variety of impulse and fatigue loads in response to the time varying flow velocity conditions in the field of the swept rotor area. Changes in fluid density, as well as factors relating to turbine geometry are also considered in turbine control and load mitigation approaches.

Developments in measurement and control techniques have resulted in increased dynamic response capabilities with respect to changing the power and rotor torque produced by the turbine blades. Modern turbines using blade pitch control continue to benefit from increasing dynamic response capabilities from blade pitch actuators since increased response capability enables more complete optimization of turbine power regulation and improves the effectiveness of the mitigation of various impulse and fatigue loads.

In the case of wind turbines, blade pitch controls serve a critical safety function by providing a means to stop the turbine by moving the blades to act as an aerodynamic brake. Otherwise the turbine cannot be stopped and such loss of control can lead to catastrophic failure of the machine, and potentially pose a safety hazard to life and property. For reasons of safety, the pitch system design must be able to sustain any plausible single point failure or common mode failure and have no more than one blade fail to reach an aerodynamic "safe", or feather, position as a result.

FIG. 1 is a schematic block diagram of a prior art DC blade control system. To satisfy this safety requirement, it is known to use electrical pitch systems with DC motors for blade pitch actuation and control using mechanical brush commutation. In these designs, a simplified example of which is shown in FIG. 1, power-switching electronics, such as an IGBT or MOSFET H-Bridge or totem poles, are used to regulate voltage or current to the motor. Blade position is measured and controlled in one of several ways by a combination of feedback sensors and electronic control processors and software. The intent is that these controls, in combination with the power switching elements that regulate motor speed and torque, result in the blade having the desired states of motion at each instant in time.

Typically, a separate, fail-safe, safety system is activated in the event of a fault in the electronic controls of the pitch system or turbine control system, preventing the continuing operation of the systems. For example, the safety system connects stored energy contained in a DC power source directly to the DC motors by electromechanical means. The motor runs to cause the blade to travel in the direction of, and stop at, the aerodynamic feather position. There is one separate and independent safety system for each turbine blade. The stopping position is controlled by position indicating switches that are mechanically linked between the blade and the motor. These limit switches electromechanically disconnect the stored energy from the pitch motor and releases power from the failsafe brake to stop the blade pitching motion.

There are at least two limitations of the mechanically commutated DC motor solution. With any motor technology the relationship between torque and inertia defines the maximum acceleration capability of the motor and the whole system it drives. With DC motors the inertia tends to be high in relation to the torque and hence the system acceleration is limited substantially by the motor inertia itself. This acceleration limit sets the overall dynamic response for the pitch actuator.

Mechanical brushes in DC motors are a maintenance item and may need to be replaced from time to time. Increasing demands on pitch actuator dynamic response tends to work against long service life for the motor brushes and commutator.

AC systems overcome one or both of the above limitations in DC mechanically commutated systems. For implementations as a servo mechanism, AC motors are electronically commutated and, as such, do not have brushes. While AC asynchronous motors have system acceleration limitations comparable to DC motor operated machines, permanent magnet AC synchronous motors eliminate brushes and have very high torque to inertia ratios by comparison and can, in principle, significantly increase dynamic response capabilities of the pitch actuator.

Existing AC system motor controls require power switching of IGBTs or MOSFETs in a three phase power bridge format, electronics and sensors to measure position and to commutate the multi phase power delivered to the rotating or static motor. Microprocessors are used to execute the commutation function and deliver switching or current control commands to the three-phase bridge so that the driven electric field has the appropriate angle with respect to the motor's magnetic field.

FIG. 2 is a schematic block diagram of a prior art brushless motor blade control system. For the sake of simplicity, not all pitch system functions or elements are shown in FIG. 2. The main drawback for a typical AC motor actuator system for pitch control is its substantial weaknesses from a safety system standpoint. For example, the normal operation and the safety operation share the same relatively complex hardware and software leading to the following:

1. Exceedingly high parts count for the hardware resulting in inherently lower reliability for the individual blade safety system;

2. Undesirably high level of complexity of the safety circuits leading to loss of reliability;

3. Common mode failure potential for all blades in the microprocessor functionality, application software implementation, and third party editor and compiler software tools.

4. The safety system on each blade relies on the same numerous and delicate parts and semiconductors used in the electronics for normal control, inviting common mode failure from AC mains generator disturbances, grid supply transients, or from lightning strikes. A systemic common mode failure caused by external electrical transients can result in a safety system failure on more than one blade.

5. Nearly any single point failure results in a failure of the safety system on at least one blade. While safety failure of one blade does not result in a catastrophic failure, such failure results in extraordinary impulse and fatigue conditions. These condition may offset the benefits of higher load mitigation capability, since the load case for the preceding condition must be accounted for at potentially higher frequency over the turbine design life than with the DC pitch system.

BRIEF SUMMARY OF THE INVENTION

The present invention broadly comprises a control system for a turbine blade, including: an operational control element for generating and outputting an operational control signal, the operational control signal for non-emergency operation of a motor for controlling pitch of the turbine blade; an emergency control element, separate from and different from the operational control element, for generating and outputting an emergency control signal for emergency operation of the motor; and, an output stage element for receiving the operational and emergency control signals and for selecting one of the operational or emergency control signals, and with a means for receiving power for operation of the motor and with a means for providing the received power to the motor according to the selected operational or emergency control signal.

In one embodiment, the output stage element includes: an output stage control element for receiving the operational and emergency control signals, for selecting one of the operational or emergency control signals, and for outputting the selected operational or emergency control signal; and an output stage element for receiving the outputted operational or emergency control signal and including the means for receiving power and the means for providing the received power.

In another embodiment, the control system includes a feedback element for sensing a position of the blade, for generating a feedback signal according to the sensed position, and for transmitting the feedback signal. The emergency control element is for receiving the feedback signal and generating the emergency control signal responsive to the feedback signal.

The present invention also broadly comprises a control system for a turbine blade, including: an operational control element for generating and outputting an operational control signal, the operational control signal for non-emergency operation of a motor for controlling pitch of the turbine blade; a feedback element for sensing a position of the motor, for generating a feedback signal according to the sensed position, and for transmitting the feedback signal; an emergency control element, separate from and different from the operational control element, for: receiving the feedback signal; generating an emergency control signal, responsive to the feedback signal, for emergency operation of the motor; and generating and outputting an emergency control signal; an output stage control element for receiving the operational and emergency control signals, for selecting one of the operational or emergency control signals, and for outputting the selected operational or emergency control signal; and an output stage element for receiving the selected operational or emergency control signal and including a means for receiving power for operation of the motor and a means for providing the received power to the motor according to the selected operational or emergency control signal.

The present invention further broadly comprises a method for controlling a turbine blade, including: generating and outputting, using an operational control element, an operational control signal for non-emergency operation of a motor for controlling pitch of the turbine blade; generating and outputting, using an emergency control element, separate from and different from the operational control element, an emergency control signal for emergency operation of the motor; and, in an output stage element: receiving the operational and emergency control signals; selecting one of the operational or emergency control signals; receiving power for operation of the motor; and providing the received power to the motor according to the selected operational or emergency control signal.

In another embodiment, the output stage element includes an output stage control element and an output stage element, receiving and selecting the operational and emergency control signals includes using the output stage control element to receive and select, and receiving power for operation of the motor and providing the received power includes using the output stage element to receive and provide.

In another embodiment, the method includes: sensing, using a feedback element, a position of the motor; generating, using the feedback element, a feedback signal according to the sensed position; transmitting, using the feedback element, the feedback signal; and receiving, using the emergency control element, the feedback signal. Generating the emergency control signal includes generating responsive to the feedback signal. In a further embodiment, the method includes receiving, using the output stage element, an emergency signal and selecting one of the operational or emergency control signals includes selecting according to the emergency signal.

The present invention broadly comprises a control system for a turbine blade, including: an operational control element for generating and outputting an operational control signal, the operational control signal for non-emergency operation of a motor for controlling pitch of the turbine blade; an operational output stage element for receiving the operational control signal and with a means for receiving power for non-emergency operation of the motor and with a means for providing the received power to the motor according to the operational control signal; an emergency control element, separate from and different from the operational control element, for generating and outputting an emergency control signal for emergency operation of the motor; and an emergency output stage element for receiving the emergency control signal and with a means for receiving power for emergency operation of the motor and with a means for providing the received power to the motor according to the emergency control signal.

In one embodiment, the operational output stage element includes: an operational output stage control element for receiving the operational control signal; and an output stage element including the means for receiving power for non-emergency operation of a motor and the means for providing the received power for non-emergency operation of a motor; or the emergency output stage element includes: an emergency output stage control element for receiving the emergency control signal; and an emergency output stage element including the means for receiving power for emergency operation of a motor and the means for providing the received power for emergency operation of a motor.

In one embodiment, the system includes a feedback element for sensing a position of the motor, for generating a feedback signal according to the sensed position, and for transmitting the feedback signal and the emergency control element is for receiving the feedback signal and generating the emergency control signal responsive to the feedback signal.

The present invention broadly comprises a method for controlling a turbine blade, including: generating and outputting, in response to a non-emergency status signal and using an operational control element, an operational control signal for non-emergency operation of a motor for controlling pitch of the turbine blade; and in an operational output stage element: receiving the operational control signal; receiving power for non-emergency operation of the motor; and providing the received power for non-emergency operation of the motor to the motor according to the operational control signal; or, generating and outputting, in response to an emergency status signal and using an emergency control element, separate from and different from the operational control element, an emergency control signal for emergency operation of the motor; and in an emergency output stage element: receiving the emergency control signal; receiving power for emergency operation of the motor; and providing the received power for emergency operation of the motor to the motor according to the emergency control signal.

In one embodiment, the operational output stage element includes an operational output stage control element and an operational output stage element, receiving the operational control signal includes using the operational output stage control element to receive, and receiving power for non-emergency operation of the motor and providing the received power for non-emergency operation of the motor includes using the operational output stage element to receive and provide. In one embodiment, the emergency output stage element includes an emergency output stage control element and an emergency output stage element, receiving the emergency control signal includes using the emergency output stage control element to receive, and receiving power for emergency operation of the motor and providing the received power for emergency operation of the motor includes using the emergency output stage element to receive and provide. In one embodiment, the method includes: sensing, using a feedback element, a position of the motor; generating, using the feedback element, a feedback signal according to the sensed position; transmitting, using the feedback element, the feedback signal; and receiving, using the emergency control element, the feedback signal. Generating the emergency control signal includes generating responsive to the feedback signal.

It is a general object of the present invention to provide a system and method for controlling a turbine blade.

These and other objects and advantages of the present invention will be readily appreciable from the following description of preferred embodiments of the invention and from the accompanying drawings and claims.

BRIEF DESCRIPTION OF THE DRAWINGS

The nature and mode of operation of the present invention will now be more fully described in the following detailed description of the invention taken with the accompanying drawings figures, in which.

DETAILED DESCRIPTION OF THE INVENTION

At the outset, it should be appreciated that like drawing numbers on different drawing views identify identical, or functionally similar, structural elements of the invention. While the present invention is described with respect to what is presently considered to be the preferred aspects, it is to be understood that the invention as claimed is not limited to the disclosed aspects.

Furthermore, it is understood that this invention is not limited to the particular methodology, materials and modifications described and as such may, of course, vary. It is also understood that the terminology used herein is for the purpose of describing particular aspects only, and is not intended to limit the scope of the present invention, which is limited only by the appended claims.

Unless defined otherwise, all technical and scientific terms used herein have the same meaning as commonly understood to one of ordinary skill in the art to which this invention belongs. Although any methods, devices or materials similar or equivalent to those described herein can be used in the practice or testing of the invention, the preferred methods, devices, and materials are now described.

Figure 1:
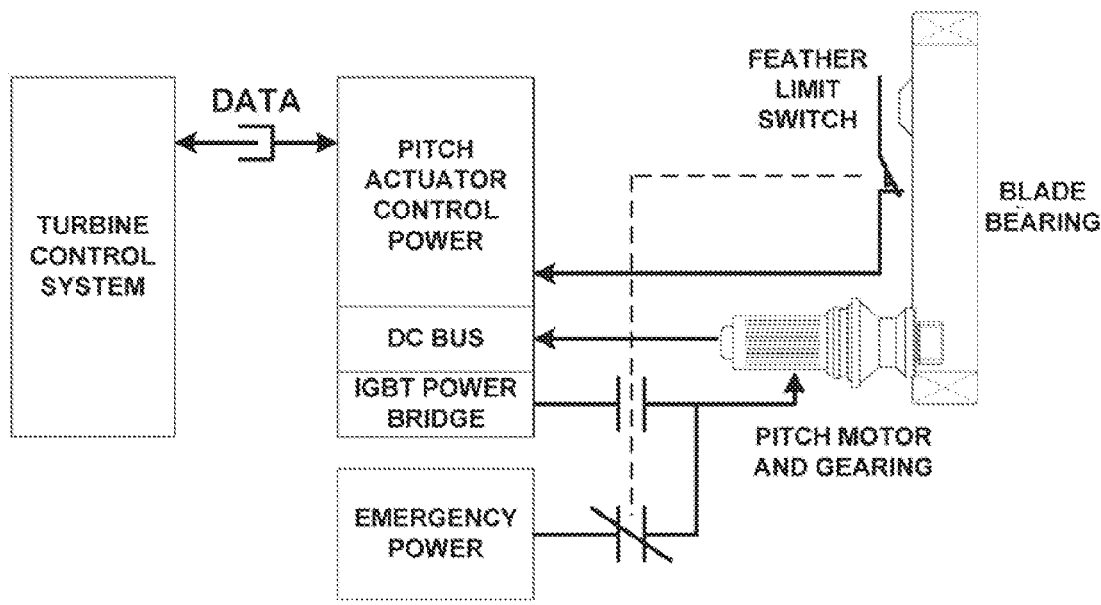
FIG. 1 is a schematic block diagram of a prior art DC blade control system.
Figure 2:
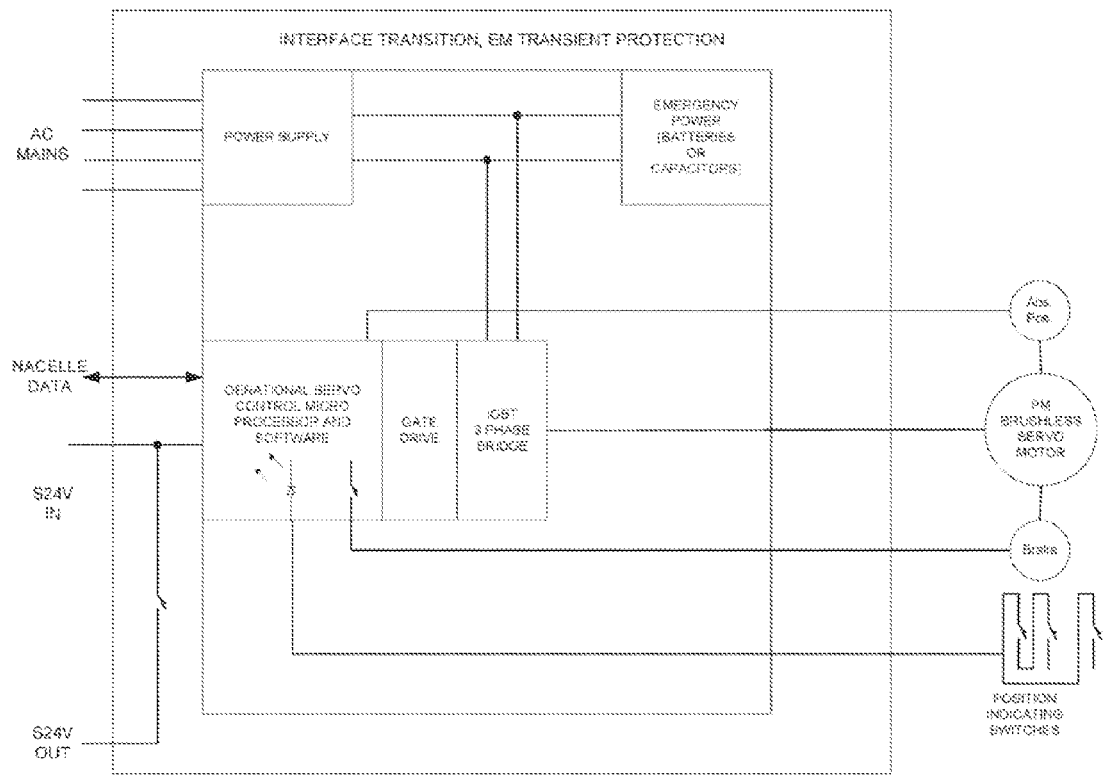
FIG. 2 is a schematic block diagram of a prior art brushless motor blade control system.
Figure 3:
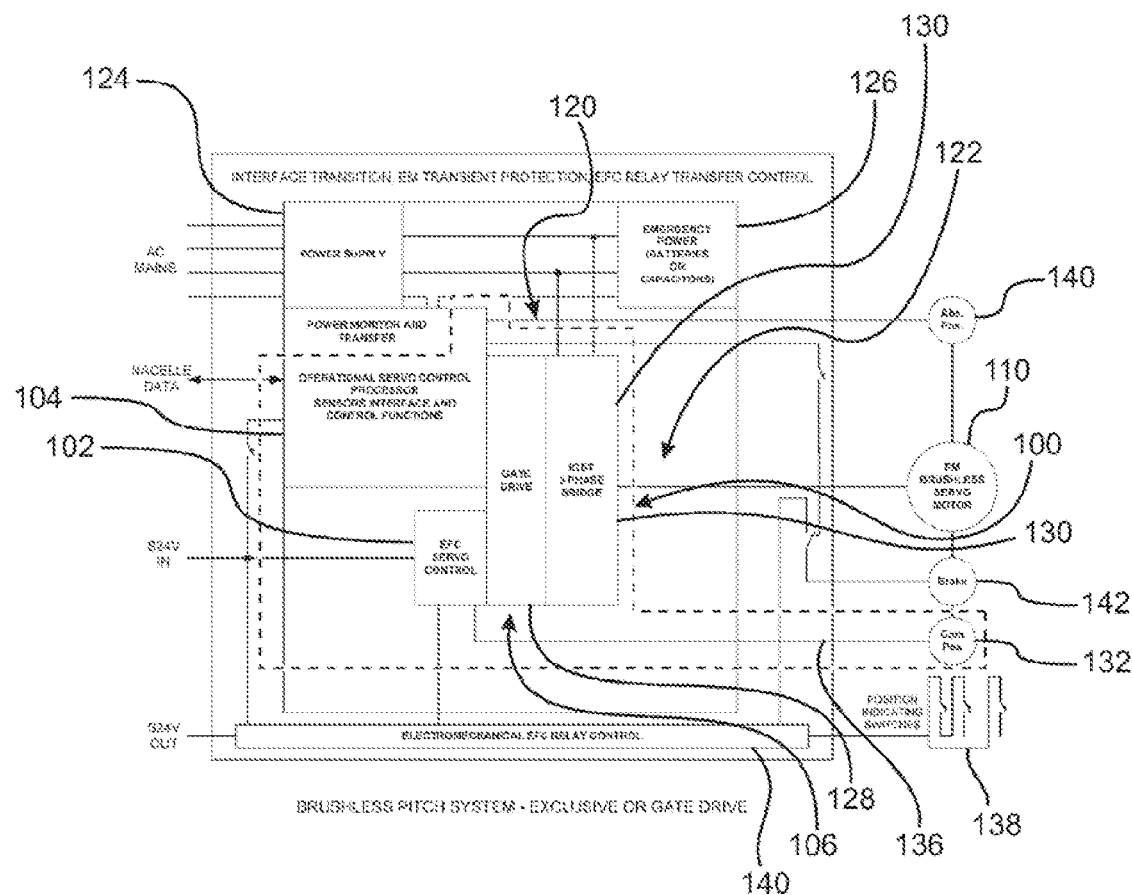
FIG. 3 is a schematic block diagram of a present invention control system for a turbine blade.

FIG. 3 is a schematic block diagram of present invention control system 100 for a turbine blade. System 100 includes emergency control element 102, operational control element 104, and output stage element 106. Element 102 is for generating and outputting an emergency control signal for emergency operation of motor 110. Element 104 is for generating and outputting an operational control signal for non-emergency operation of motor 110, that is, operation under standard, on-going, or normal operating conditions. The motor is for controlling the pitch of a blade (not shown) connected to the motor. In one embodiment, the motor is a brushless AC motor. Advantageously, element 102 is separate from and different from the operational control element. Thus, element 102 is isolated from failures in element 104 that could compromise the operation of element 102 if elements 102 and 104 were not separate, for example, if the elements shared circuitry or components. Elements 102 and 104 receive an emergency status signal, which indicates whether operation in emergency or non-emergency mode is required. Any means known in the art can be used for the status signal, for example, voltage S24V IN is monitored by elements 102 and 104. In one embodiment, voltage on the line indicates non-emergency operation and a lack of voltage or voltage below a predetermined threshold indicates operation in emergency mode.

The output stage element is for receiving the operational and emergency control signals and for selecting one of the operational or emergency control signals according to the emergency status signal. For example, for voltage S24V IN below the threshold noted above, element 106 selects the emergency control signal, and for voltage S24V IN above the threshold noted above, element 106 selects the operational control signal. Any condition known in the art for system 100 or for a turbine (not shown) including system 100 can be monitored or detected to generate the emergency status signal.

Element 106 includes means, for example, terminals 120, for receiving power for operation of the motor and means, for example, terminals 122, for providing the received power to the motor according to the selected operational or emergency control signal. Any power receiving and transmitting means known in the art can be used. Element 106 can receive and transmit power from any power sources known in the art, for example, power supply 124 for normal operation and emergency power supply 126, which can, for example, be a battery or capacitor power supply.

In one embodiment, the output stage element includes output stage control element 128 and output stage element 130. Element 128 is for receiving the operational and emergency control signals, selecting one of the operational or emergency control signals, and outputting the selected operational or emergency control signal. Element 130 is for receiving the outputted operational or emergency control signal and includes the means for receiving power and the means for providing the received power.

In one embodiment, system 100 includes feedback element 132 for sensing a position of the rotor, for generating a feedback signal according to the sensed position, and for transmitting the feedback signal. The emergency control element is for receiving the feedback signal, for example, on line 136, and generating the emergency control signal responsive to the feedback signal. That is, the emergency control signal is generated to account for the position of the rotor. Alternately stated, element 132 provides rotor angle information used to electrically commutate electrical current for the motor. In one embodiment, the feedback signal is used to control the movement of the blade toward the feather position, and limit switch 138 is used to determine when the blade has reached the feather position. A signal from the limit switch is then used to stop the motor rotation. For example, a signal is transmitted from the limit switch to relay control unit 140 when the blade reaches the feather position and unit 140 passes the signal on to element 102. Unit 140 also transmits a signal to brake 142 to brake the motor at the feather position. In one embodiment, when the blade reaches the desired terminal position, data in the feedback signal describes this position and element 102 determines that the blade no longer needs to be rotated and generates the emergency control signal to cease rotation of the blade.

It should be understood that system 100 can be operated without feedback sensor 132. For example, if emergency operation is enabled for system 100, element 102 can generate the emergency control signal to drive the blade to the feathered position, regardless of the position of the blade when the emergency control signal is generated. In this case, element 130 generates the desired motor current and the motor eventually synchronizes with the desired current. In another case, data regarding a position of the motor rotor can be obtained directly from the motor and used to generate the emergency control signal.

System 100 can be described as using an "exclusive OR" approach with respect to control signals for the blade. In one embodiment, system 100 uses an "exclusive OR gate drive" approach. For example, element 130 includes IGBTs or MOSFETs (not shown) and the control of circuits (not shown) in element 128 that operate gates of the power switching of the IGBTs or MOSFETs, for example, in a three phase power bridge format, is responsive to normal operation control, for example, the operational control signal, or in an emergency, to emergency operation control, for example, the emergency control signal. In emergency mode, system 100 controls motor 110 so the blade displaces to the feather, or braking, position. Thus, emergency operation does not rely on and is independent of operational, that is, non-emergency, servo control sensors, for example, motor position feedback sensor 140, and processing hardware or software (not shown) in a control arrangement for normal, or non-emergency operation, for example, element 104.

To reduce the size, cost, and complexity of system 100, while optimizing the separation of emergency and non-emergency control signal generation, element 106 is used for both normal and emergency operation. For example, IGBTs or MOSFETs and attendant gate drive circuits in element 106 are shared for normal and emergency operation. Advantageously, and as further described infra, emergency control operation in element 102 is implemented using less and simpler hardware and with far fewer components than are needed for normal operation, for example, in element 104. Due to the simplified requirements for emergency operation, the hardware and components in element 102 also are more robust than hardware and components typical for element 104. As noted supra, in one embodiment, separate and redundant motor feedback element 132 is included to enhance reliability, avoid software decoding, for example, associated with signals from sensor 140, and permit simpler and more reliable circuit designs.

Alternately stated, system 100 includes an emergency control system separate from and simpler than a normal-operation control system, but that shares armature output stage and the motor with the normal control system. Advantageously, this arrangement reduces the amount, vulnerability, and complexity of components in the emergency path, and in one embodiment, removes common software between the normal and emergency operations. Thus, cost and space requirements are each reduced.

In one embodiment, element 132 is a resolver feedback device, an electromechanical device that does not contain any active components. Due to the lack of active components, the resolver device is extremely rugged and the components in the resolver device are much more able than active components to resist failure in the presence of electrical disturbances, for example, lightning strikes, around the motor. For example, a resolver relies only on mechanical operation, for example, a resolver contains wound coils and is very rugged and immune to failure from electrical disturbances or other coupled transient events. Also, a resolver has a much broader temperature range of operation than typical feedback devices containing electronics. Therefore, in the event of thermal problems with the motor, the resolver is less likely to suffer temperature-related problems and is able to continue to provide feedback data.

It should be understood that other position feedback devices could be used and are included in the spirit and scope of the claimed invention. For example, a Hall feedback device can be used. For example, in one embodiment (not shown), a Hall feedback device is used with a six step current modulation scheme.

In the descriptions that follow, it is assumed that motor 110 is a three phase motor. However, it should be understood that motors with other than three phases are usable with system 100 and that the description that follows is applicable to motors with other than three phases.

Advantageously, since element 102 is separate from element 104, fewer components are shared between normal operation and emergency operation and thus, the number of common mode failure points are minimized. In one embodiment, the design of respective gate drive characteristics can be optimized in each element to optimize performance for operation and robust brute force reliability in the emergency control.

Monitoring schemes (not shown) can be developed to monitor and indicate the readiness of element 102 during normal operation. For example, if the monitoring determines a loss of readiness for element 102, element 104 automatically returns the blades to feather position.

Advantageously, the number of semiconductors in system 100, for example, for motor power conversion, are held to a minimum number required for the purpose, can be design optimized for robust reliable safety operation independently, based on normal operational requirements. These semiconductors also can be held in isolation, and more strongly protected from common mode transient conditions described supra.

The following should be viewed in light of FIG. 3. The following describes a present invention method for controlling a turbine blade. Although the method is presented as a sequence of steps for clarity, no order should be inferred from the sequence unless explicitly stated. A first step generates and outputs, using an operational control element, an operational control signal for non-emergency operation of a motor for controlling pitch of the turbine blade; a second step generates and outputs, using an emergency control element, separate from and different from the operational control element, an emergency control signal for emergency operation of the motor; and in an output stage element: a third step receives the operational and emergency control signals; a fourth step selects one of the operational or emergency control signals; a fifth step receives power for operation of the motor; and a sixth step provides the received power to the motor according to the selected operational or emergency control signal.

In one embodiment, the output stage element includes an output stage control element and an output stage element, receiving and selecting the operational and emergency control signals includes using the output stage control element to receive and select, and receiving power for operation of the motor and providing the received power includes using the output stage element to receive and provide. In one embodiment, a seventh step senses, using a feedback element, a position of the motor; an eighth step generates, using the feedback element, a feedback signal according to the sensed position; a ninth step transmits, using the feedback element, the feedback signal; and a tenth step receives, using the emergency control element, the feedback signal and generating the emergency control signal includes generating responsive to the feedback signal.

Figure 4:
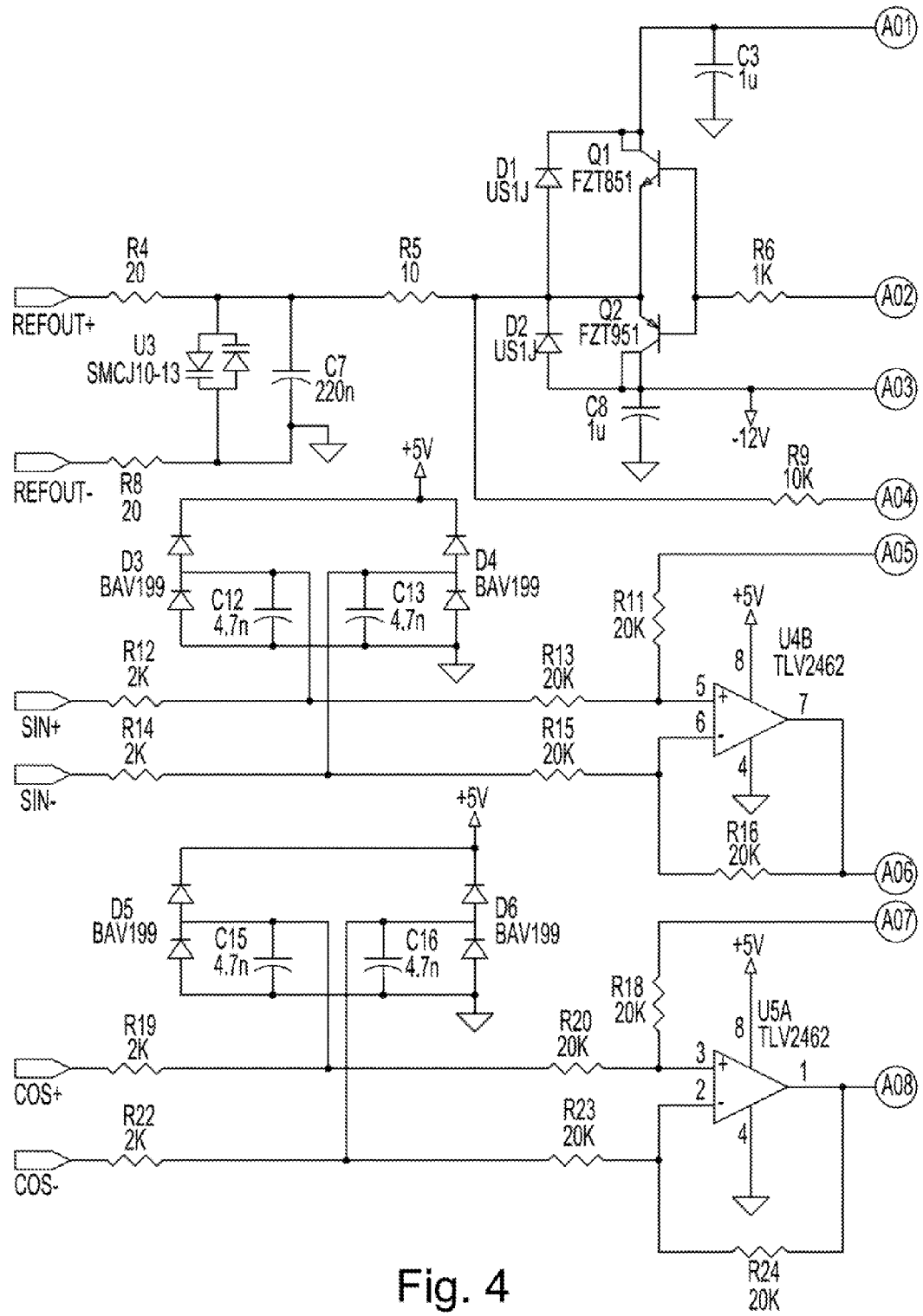
FIG. 4 is a schematic for a circuit to generate a feedback signal.
Figure 4:
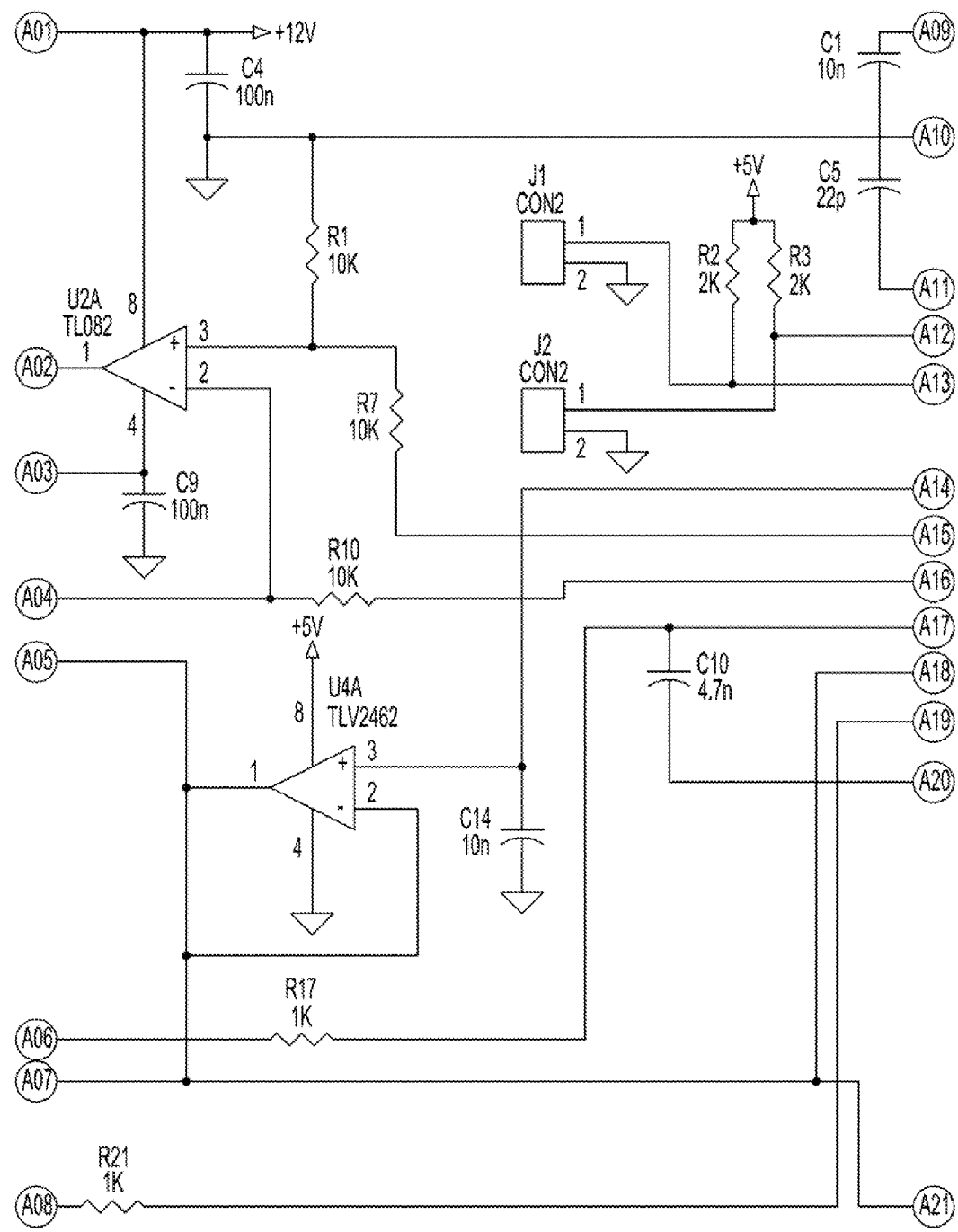
Figure 4:
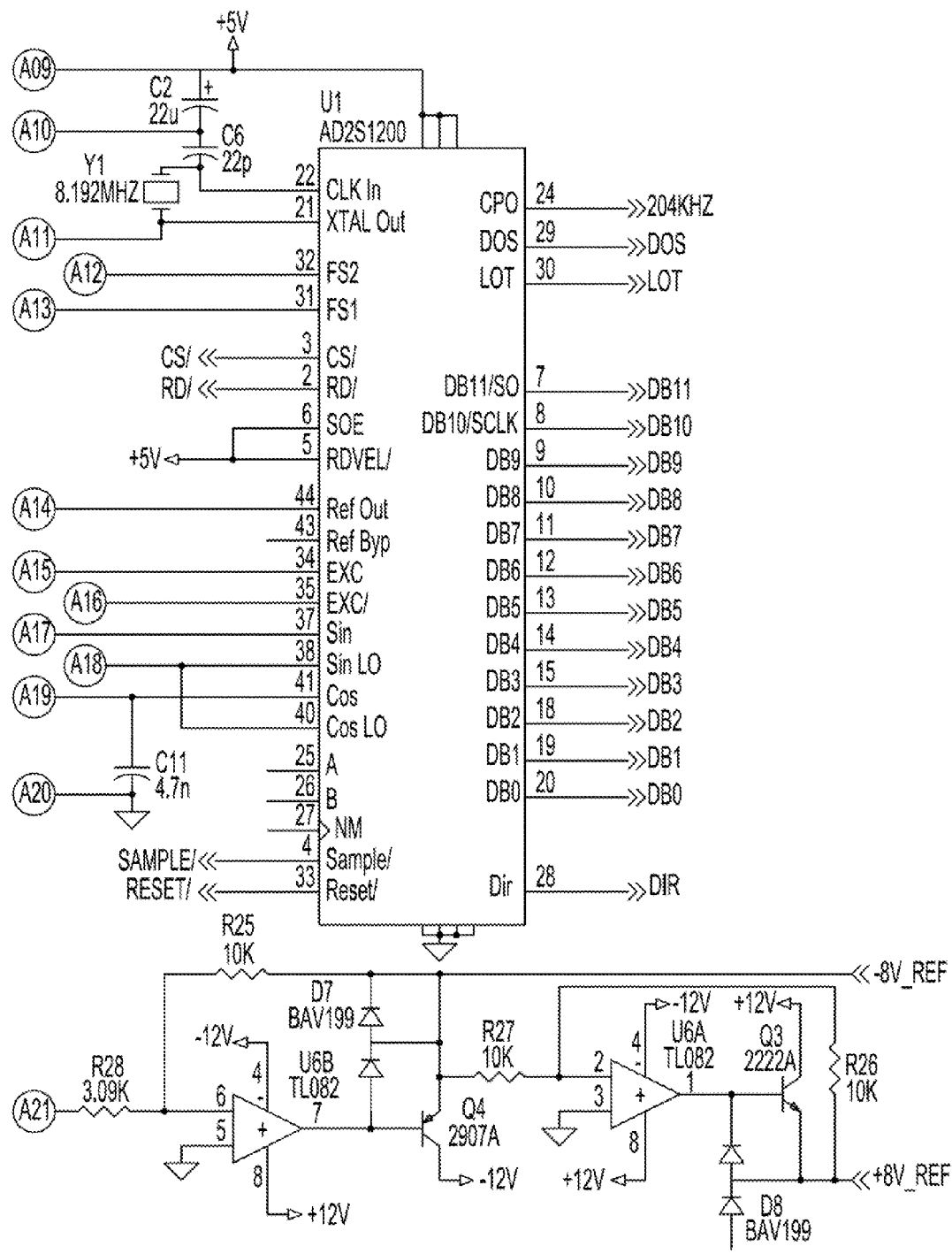

FIG. 4 is a schematic for circuit 200 to generate a feedback signal. The following should be viewed in light of FIGS. 3 through 4. In one embodiment, system 100 includes element 132, which is a resolver. Circuit 200 is an exemplary circuit for generating a reference drive for the resolver position feedback device and processing the feedback signals from the resolver to produce an angular motor rotor position for the blade. However, it should be understood that system 100 is not limited to the arrangement shown in FIG. 4 and that other circuit arrangements for generating a feedback signal, for example, a reference drive and processing a feedback signal are included in the spirit and scope of the claimed invention.

The following is a brief description of the components shown in FIG. 4:

U1: This circuit is the Resolver feedback to Digital position converter (R/D). It generates a sinusoidal reference signal (Ref Out) for a resolver feedback device and receives sinusoidal feedback from the resolver (Sin, Sin Lo, and Cos, Cos Lo) which uses the reference signal output as a carrier signal.

The R/D converter uses the reference and feedback signals to calculate a digital position output and places the digital information on the data outputs DB0 through DB11;

C1, C2, C5, C6, Y1: These components are used to generate a clock frequency for the R/D converter;

J1, J2, R2, R3: These components are used to select the frequency of the reference signal.

R1, R4, R5, R6, R7, R8, R9, R10, U2A, U3, C3, C4, C7, C8, C9, D1, D2, Q1, Q2: These components are used to amplify the reference signal to properly drive the reference coil of the resolver;

R11, R12, R13, R14, R15, R16, R17, C10, C12, C13, D3, D4, U4B: These components buffer the resolver sine feedback signal and scale it to the appropriate range for use by the R/D converter integrated circuit U1;

R18, R19, R20, R21, R22, R23, R24, C11, C15, C16, D5, D6, U5A—These components buffer the resolver cosine feedback signal and scale it to the appropriate range for use by the R/D converter integrated circuit U1;

C14, U4A: These components are used to buffer the Ref Out signal from the R/D converter. This buffered signal is then used to offset the sine and cosine feedback signals to change them from bipolar signals to unipolar signals for use by the R/D converter; and R25, R26, R27, R28, D7, D8, Q3, Q4, U6A, U6B: These components are used to generate positive and negative 8 volt reference signals. These signals are used by the velocity control circuitry.

Figure 5:
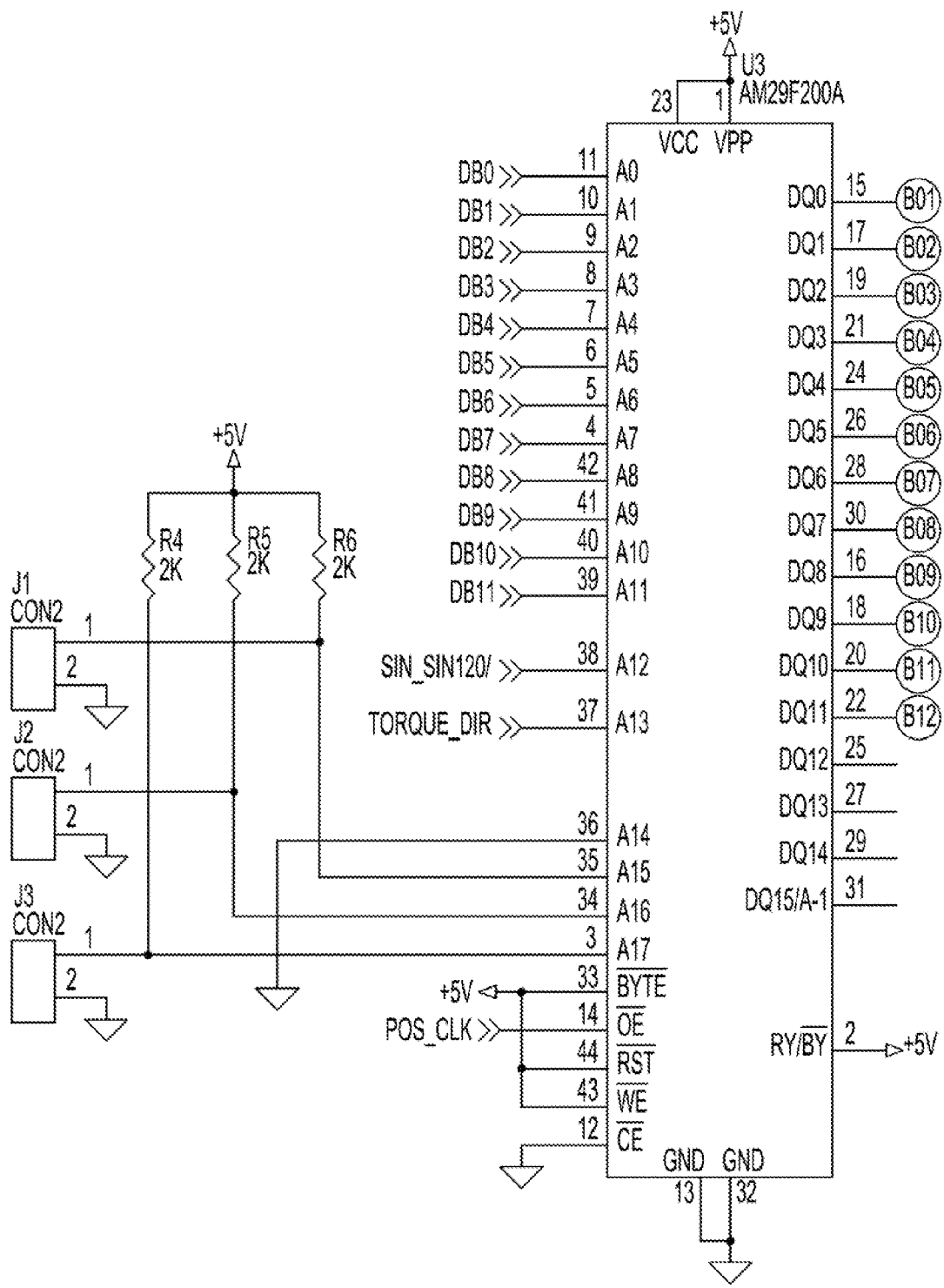
FIG. 5 is a schematic for a circuit to generate command signals for the motor.
Figure 5:
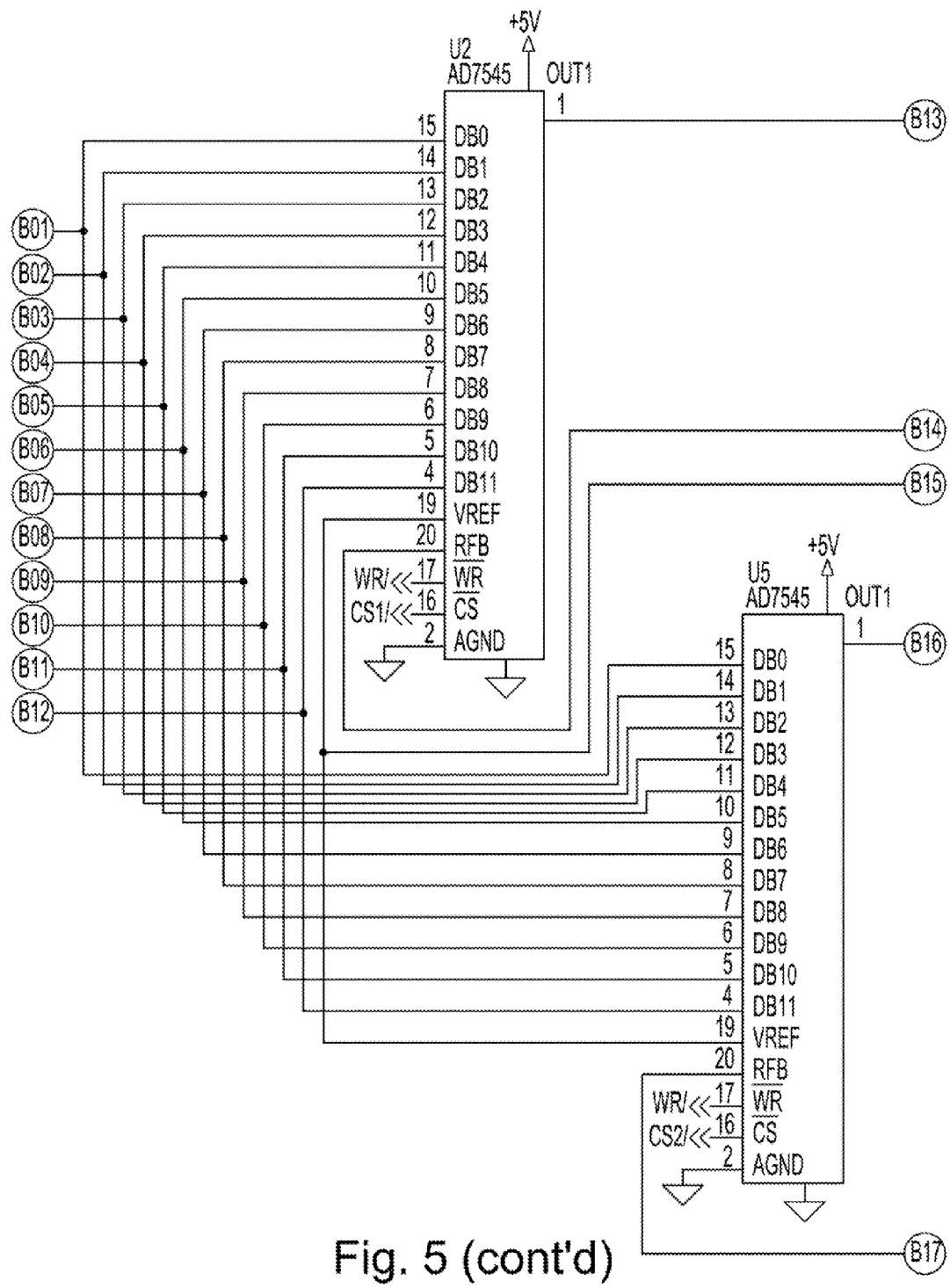
Figure 5:
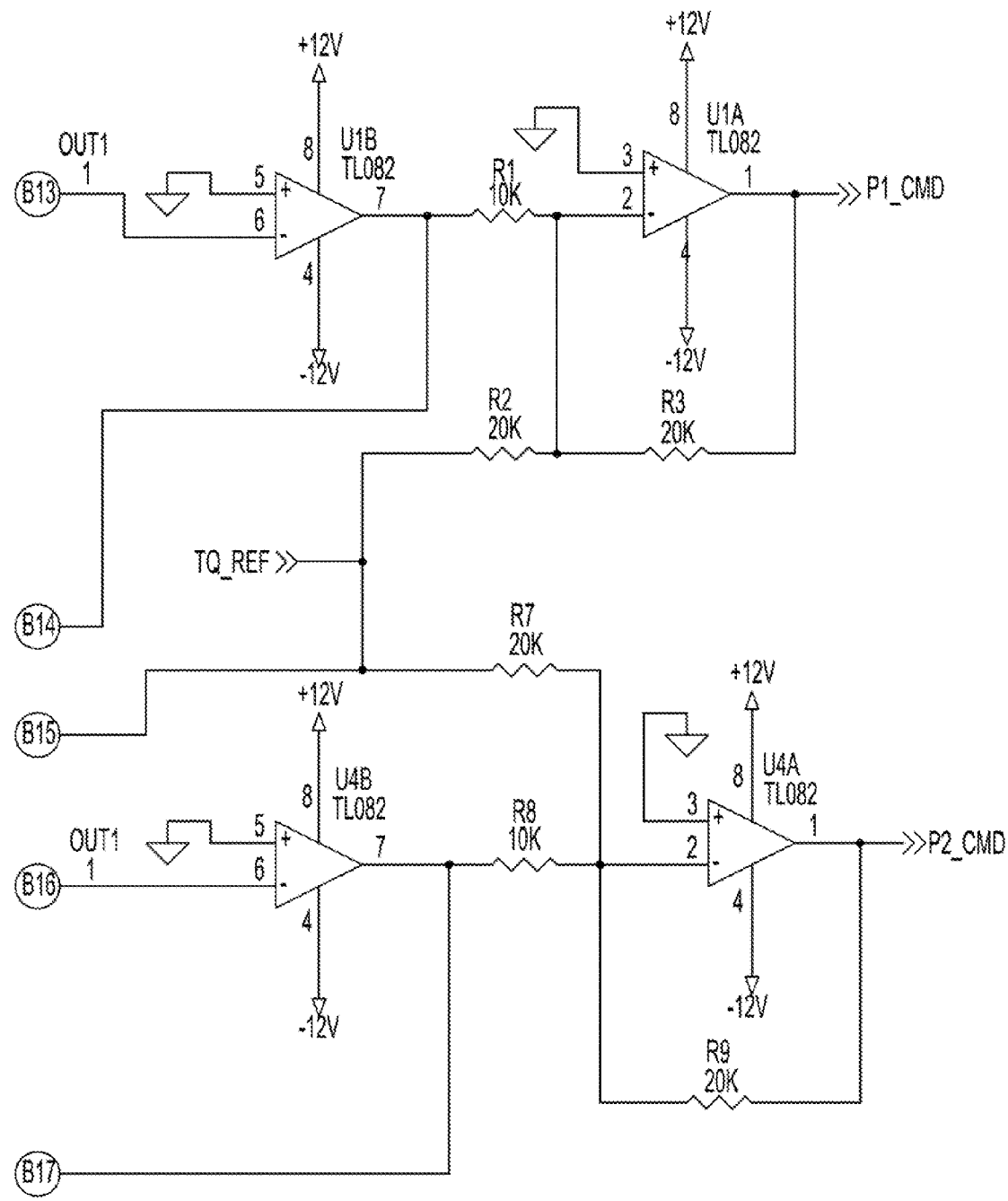

FIG. 5 is a schematic for circuit 300 to generate command signals for the motor. The following should be viewed in light of FIGS. 3 through 5. Circuit 300 is an exemplary circuit for generating armature current commands, based on the rotor angle, for example, as included in the feedback signal from element 132. However, it should be understood that system 100 is not limited to the arrangement shown in FIG. 5 and that other circuit arrangements for generating current commands are included in the spirit and scope of the claimed invention. The current commands are for two of the three phases of the motor. In one embodiment, the feedback signal is used by a velocity control loop and the current commands are at least partially generated by the velocity control loop.

The following is a brief description of the components shown in FIG. 5:

U3: This circuit is operated as a read only memory (ROM) device that is used to output digital motor commutation angles, for example, for phase 1 and phase 2 of motor 110 based on inputs from the digital rotor angle generated by the R/D converter, a torque direction signal from the velocity control loop, and sin(θ)/sin(θ+120) signal used to select the angle for phase 1 or phase 2 of the motor. These digital phase commutation angles are placed on the signals DQ0 through DQ11. Digital rotor angles from the R/D converter are input to this device on signals DB0 through DB11.

The motor commutation angles are generated by lookup tables within U3. Signals DB0 through DB11 help to determine the offset into the selected table within U3. When the control signals of U3 are correct, the data at this offset in the internal table is then placed onto the output signals DQ0 through DQ11. U3 contains multiple tables that can have different ratios of translation between the digital resolver angles from the R/D converter to the digital commutation angles placed on the outputs of U3. This is useful to be able to easily accommodate motors with various pole counts should it change from one application to another;

R4, R5, R6, J1, J2, J3: These components are used to select between tables stored in U3 that contain various ratios of motor to resolver pole counts for electrical commutation.

These tables translate between the R/D rotor angle and the proper motor armature commutation angle. Without the proper motor commutation angle, the motor does not rotate efficiently, if at all. As shown, jumpers J1, J2, and J3 can be used to select between eight different commutation ratio tables contained within U3.

As examples, if element 132 is a single speed resolver (1 electrical cycle of resolver signals per motor rotor revolution) attached to a motor with 2 rotor poles (1 electrical cycle per motor revolution), then a ratio of 1 motor rotor cycle per revolution to 1 resolver cycle per revolution (1:1) is needed to properly electrically commutate the motor armature currents. If the motor had 8 rotor poles (4 electrical cycles per motor revolution) then a ratio of 4 rotor cycles per revolution to 1 resolver cycle per revolution (4:1) is then needed to properly electrically commutate the armature currents.

Within each table in U3 are four sections of positive and negative motor torques for both phase 1 and phase 2 currents of the motor. These are selected according to TORQUE_DIR and SIN_SIN120/signals;

R1, R2, R3, U1A, U1B, U2: These components are used to generate the motor armature's phase 1 current commands. U2 receives a digital input representing the magnitude of the motor commutation angle on its DB0 through DB11 inputs and multiplies that magnitude with the analog voltage on its VREF input. The VREF input has a signal (TQ_REF) representing the torque required from the motor to drive it at the speed reference supplied to the velocity control loop. This TQ_REF is a unipolar signal and is multiplied by the digital commutation angle for phase 1 latched from signals DB0 through DB11. The latching of the digital information is controlled by the WR and CS signals; and R7, R8, R9, U4A, U4B, U5: These components are used to generate the motor armature's phase 2 current commands in the same fashion as the previous description for phase 1 current commands.

Figure 6:
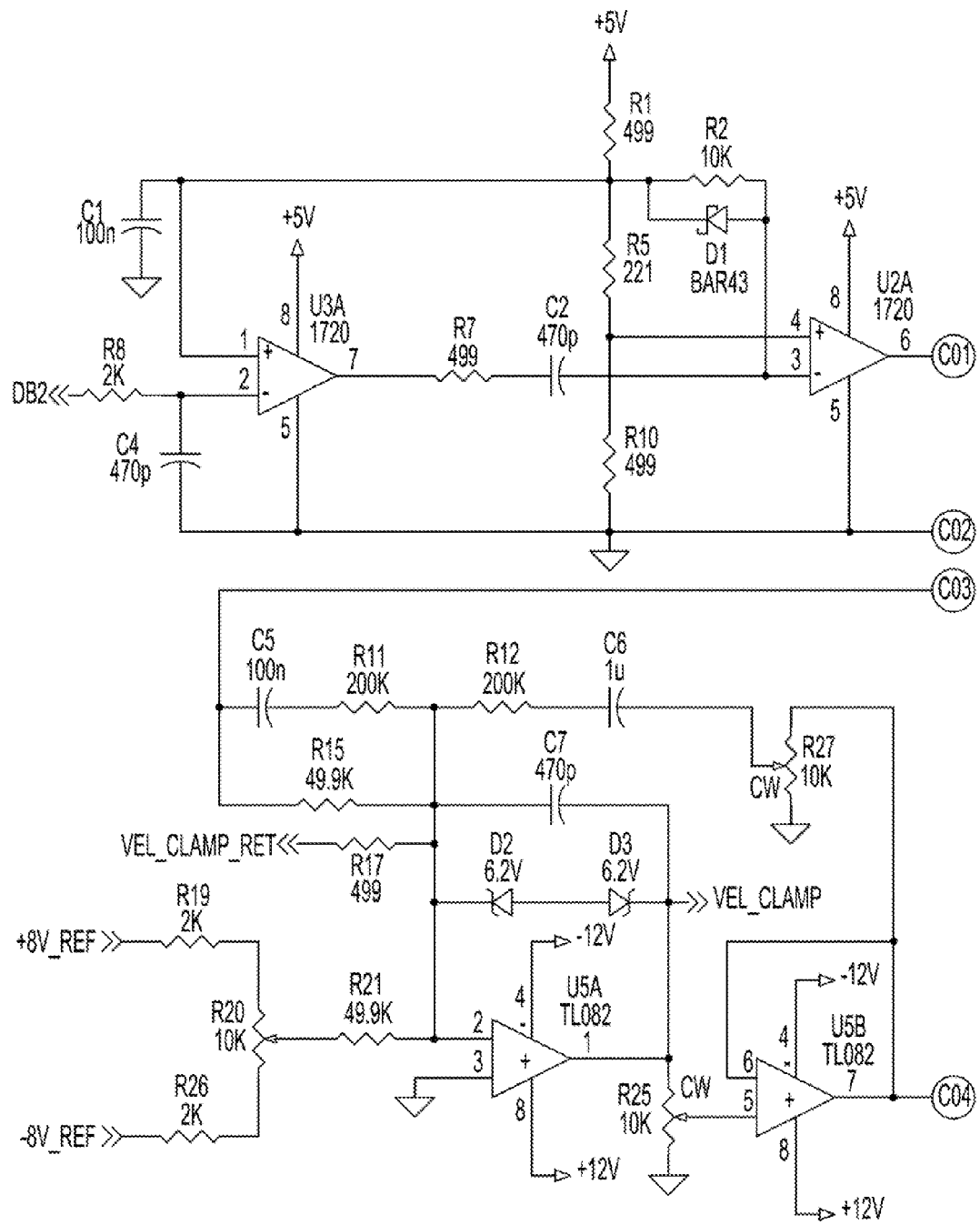
FIG. 6 is a schematic for a circuit to generate a torque command for the motor.
Figure 6:
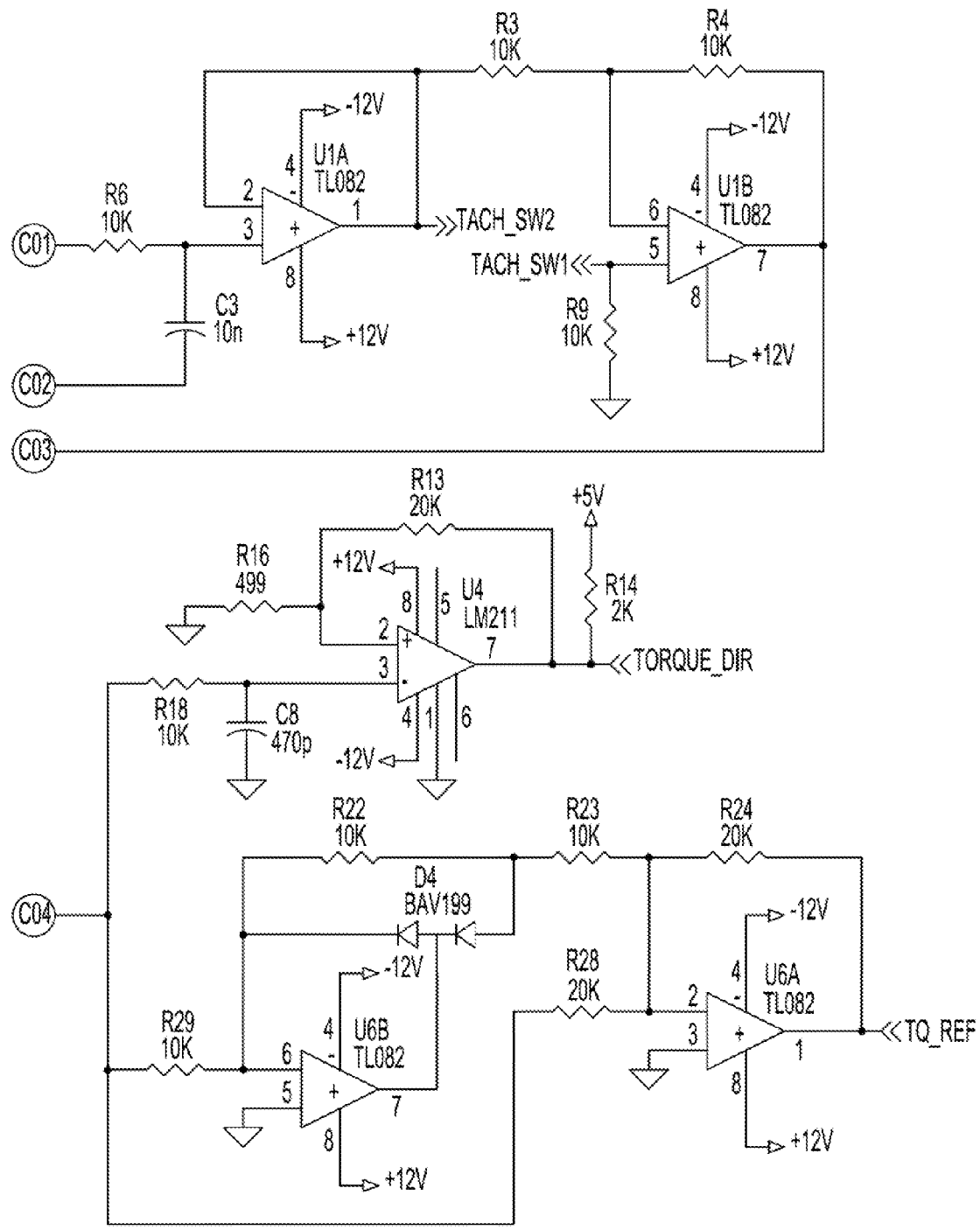

FIG. 6 is a schematic for circuit 400 to generate a torque command for the motor. The following should be viewed in light of FIGS. 3 through 6. Circuit 400 is an exemplary circuit for generating a motor torque command reference based on a velocity command reference and velocity feedback. However, it should be understood that system 100 is not limited to the arrangement shown in FIG. 6 and that other circuit arrangements for generating a motor torque command reference are included in the spirit and scope of the claimed invention. The velocity command reference is set by components in circuit 400 and the velocity feedback signal is derived from a bit taken from the output of the R/D converter.

The following is a brief description of the components shown in FIG. 6:

R1, R2, R5, R6, R7, R8, R10, C1, C2, C3, C4, D1, U1A, U2A, U3A: These components generate a unipolar velocity feedback signal (U1A-1) from a pulse train signal (DB2) that is a selected bit of the resolver to digital conversion output. Various output bits from the R/D could be used for this function, depending on the speed range of control desired. The frequency of DB2 varies with the speed of the motor rotation. A rising edge on DB2 causes a pulse of current to charge C3. As the frequency of DB2 increases, the pulse rate into C3 increases causing the voltage across C3 to rise. The voltage across C3 is buffered by the amplifier U1A and is present on U1A-1;

R3, R4, R9, U1B: These components, along with the analog switch connected to signals TACH_SW1 and TACH_SW2 convert the unipolar velocity signal on TACH_SW2 into a bipolar signal on U1B-7. The analog switch that opens and closes between the TACH_SW1 and TACH_SW2 signals is controlled by the direction indication bit from the R/D converter. When the direction bit changes polarity, the gain of this network changes between a positive unity gain to a negative unity gain, thus changing the positive unipolar voltage on TACH_SW2 to a bipolar signal on U1B-7;

R11, R12, R15, R17, R19, R20, R21, R25, R26, R27, C5, C6, C7, D2, D3, U5A, U5B: These components are used to regulate the velocity of the motor during the emergency move to the feather position. This circuitry closes the velocity loop and the output of this circuitry on U5B-7 is the velocity error, which is also referred to as the motor torque reference command. R19, R20, and R26 make the velocity reference for the controlled motion to the feather position. This reference is summed with the velocity feedback that passes through the filter network of C5, R11, and R15. R12, R27, C6, and C7 provide the control loop compensation and gain adjustment. D2 and D3 clamp the maximum velocity error signal that can be generated by U5A. R25 is used to scale the velocity error (current command) which in turn scales the current developed in the motor. U5B is used to buffer the signal taken from R25.

The signals VEL_CLAMP and VEL_CLAMP_RET go to an analog switch which is closed when emergency motion control is not active. This clamps the current command from U5B-7 and discharges any voltages stored in C6 and C7;

R13, R14, R16, R18, C8, U4: These components are used to make a digital signal that corresponds to the polarity of the velocity error supplied to R18. This digital signal is represented by the TORQUE_DIR signal. The TORQUE_DIR signal is then used by the memory device that holds the commutation lookup tables for generating the phase 1 and phase 2 commutation angle magnitude signals. The polarity of the TORQUE_DIR signal causes a different section of the table to be selected depending on whether it is a high value or a low value. This table lookup difference is necessary to provide proper commutation of the motor while controlling the motor speed for the different regions of the motor operation such as the motoring or regenerative operating regions; and R22, R23, R24, R28, R29, D4, U6A, U6B: These components are used to make an absolute value circuit. This circuit converts the bipolar torque command signal into R29 into the unipolar TQ_REF signal out of U6A-1. The TQ_REF signal is then fed to the motor commutation circuitry to generate the motor current commands.

Figure 7:
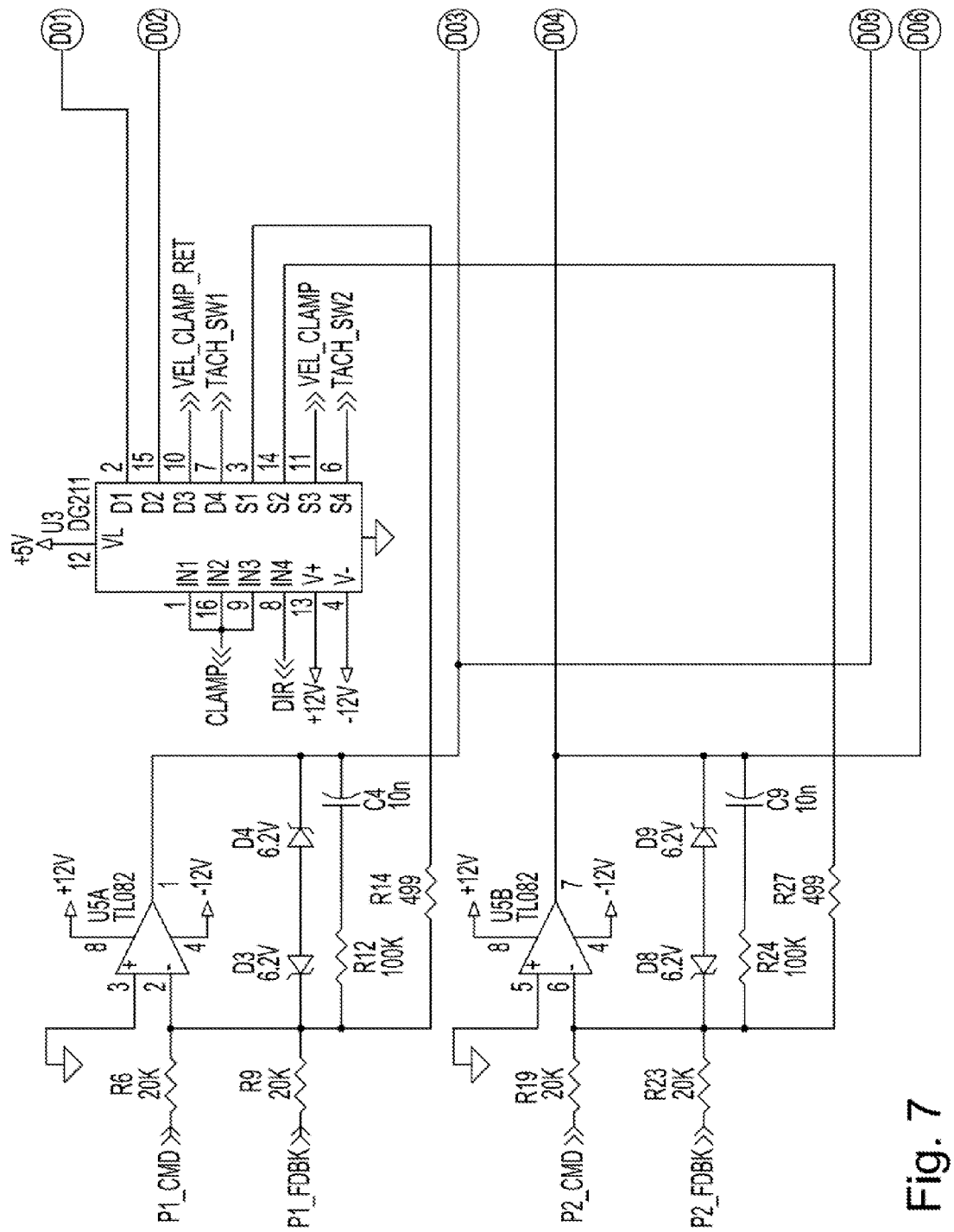
FIG. 7 is a schematic for a circuit to generate an emergency control signal for emergency operation of the motor.
Figure 7:
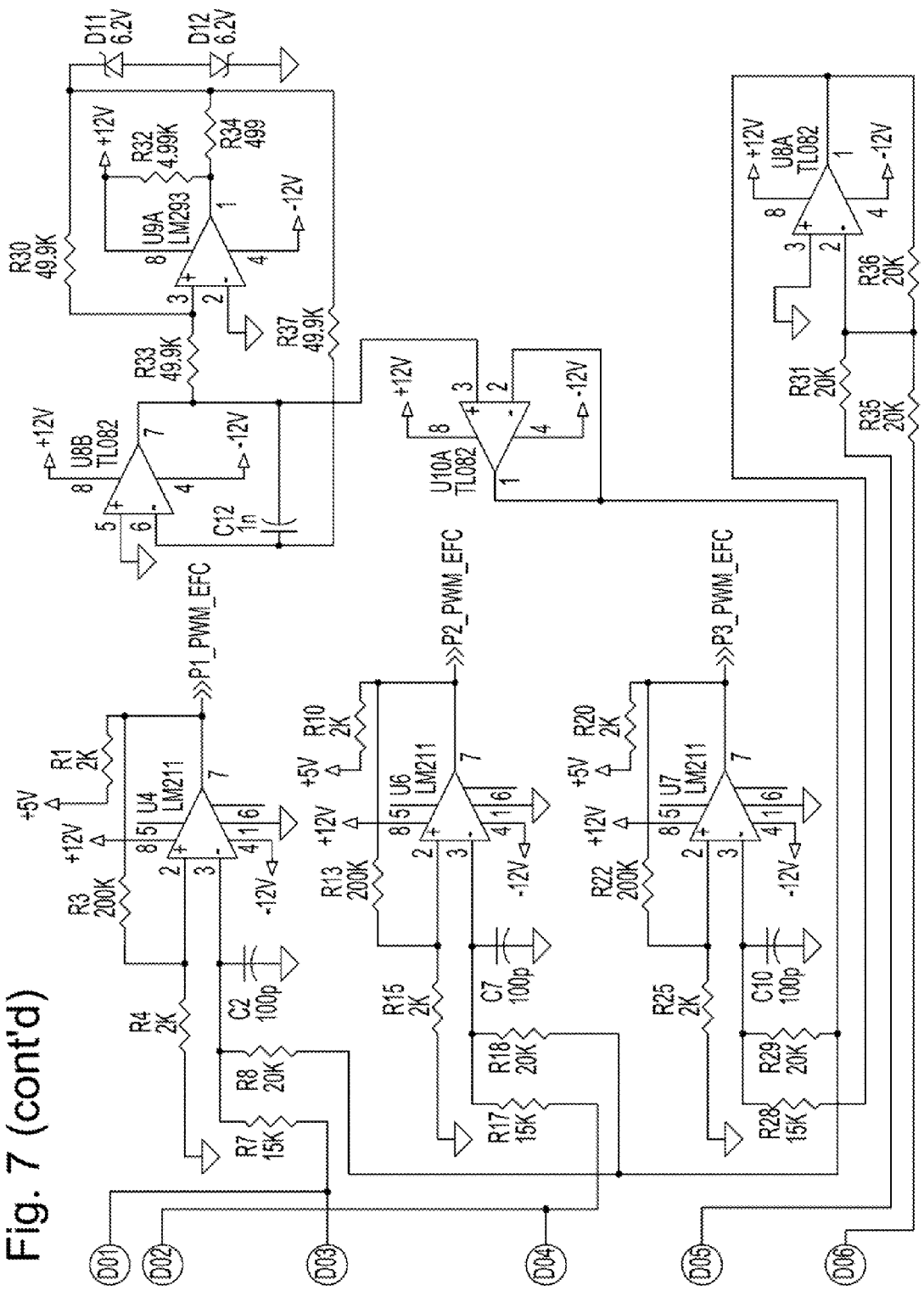

FIG. 7 is a schematic for circuit 500 to generate an emergency control signal for emergency operation of the motor. The following should be viewed in light of FIGS. 3 through 7. Circuit 500 is an exemplary circuit for generating signal 108, for example, reference Pulse Width Modulated (PWM) transistor output stage control signals for emergency operation for all three motor phases from the phase 1 and phase 2 armature current command references. For example, the output control signals are transmitted from element 102 to element 126. It should be understood that other output stage control components and arrangements are included in the spirit and scope of the claimed invention. It also should be understood that system 100 is not limited to the arrangement shown in FIG. 7 and that other circuit arrangements for generating an output control signal for emergency operation of the motor are included in the spirit and scope of the claimed invention.

The following is a brief description of the components shown in FIG. 7:

R6, R9, R12, R14, C4, U3, U5A, D3, D4: These components sum the phase 1 armature current command (P1_CMD) and the phase 1 armature current feedback (P1_FDBK), to generate the phase 1 armature current error signal that is amplified at U5A-1 and clamped by D3 and D4. Also, U3 contains an analog switch that is controlled by the CLAMP signal to clamp the output of this network at U5A-1 to zero volts when emergency movement to the feather position is not active. Activating the analog switch discharges any voltage stored in feedback capacitor C4;

R19, R23, R24, R27, C9, U3, U5B, D8, D9: These components perform the same function for phase 2 of the motor as the previous description does for phase 1 of the motor;

U3: In addition to analog switches for controlling the phase 1 and phase 2 armature current error signals, U3 also contains an analog switch that clamps the gain of the velocity control loop and discharge the integral gain capacitor in that control loop. This is done with signals VEL_CLAMP, VEL_CLAMP_RET, and CLAMP.

Additionally, U3 contains an analog switch that is used to make a bipolar signal of the velocity feedback signal from a unipolar signal. This is done with signals TACH_SW1, TACH_SW2, and DIR.

R31, R35, R36, U8A: These components sum and invert the phase 1 and phase 2 armature current error signals to generate the phase 3 armature current error signal;

R30, R32, R33, R34, R37, C12, D11, D12, U8B, U9A, U10A: These components generate a reference triangle wave that is used by the PWM comparator circuits. The triangle wave is generated at U8B-7 and is buffered by U10A;

R1, R3, R4, R7, R8, C2, U4: These components generate the phase 1 reference Pulse Width Modulated (PWM) signal at U4-7 based on the phase 1 error signal and reference triangle wave. The frequency is determined by the frequency of the triangle wave into R8. The duty cycle is determined by the compared levels of the triangle wave and the error signal. This PWM signal is used to control the phase 1 output stage transistors during emergency motion to feather;

R10, R13, R15, R17, R18, C7, U6: These components generate the phase 2 reference Pulse Width Modulated (PWM) signal in the same fashion as the previous section does for phase 1; and R20, R22, R25, R28, R29, C10, U7: These components generate the phase 3 reference Pulse Width Modulated (PWM) signal in the same fashion as the previous section does for phase 2.

Figure 8:
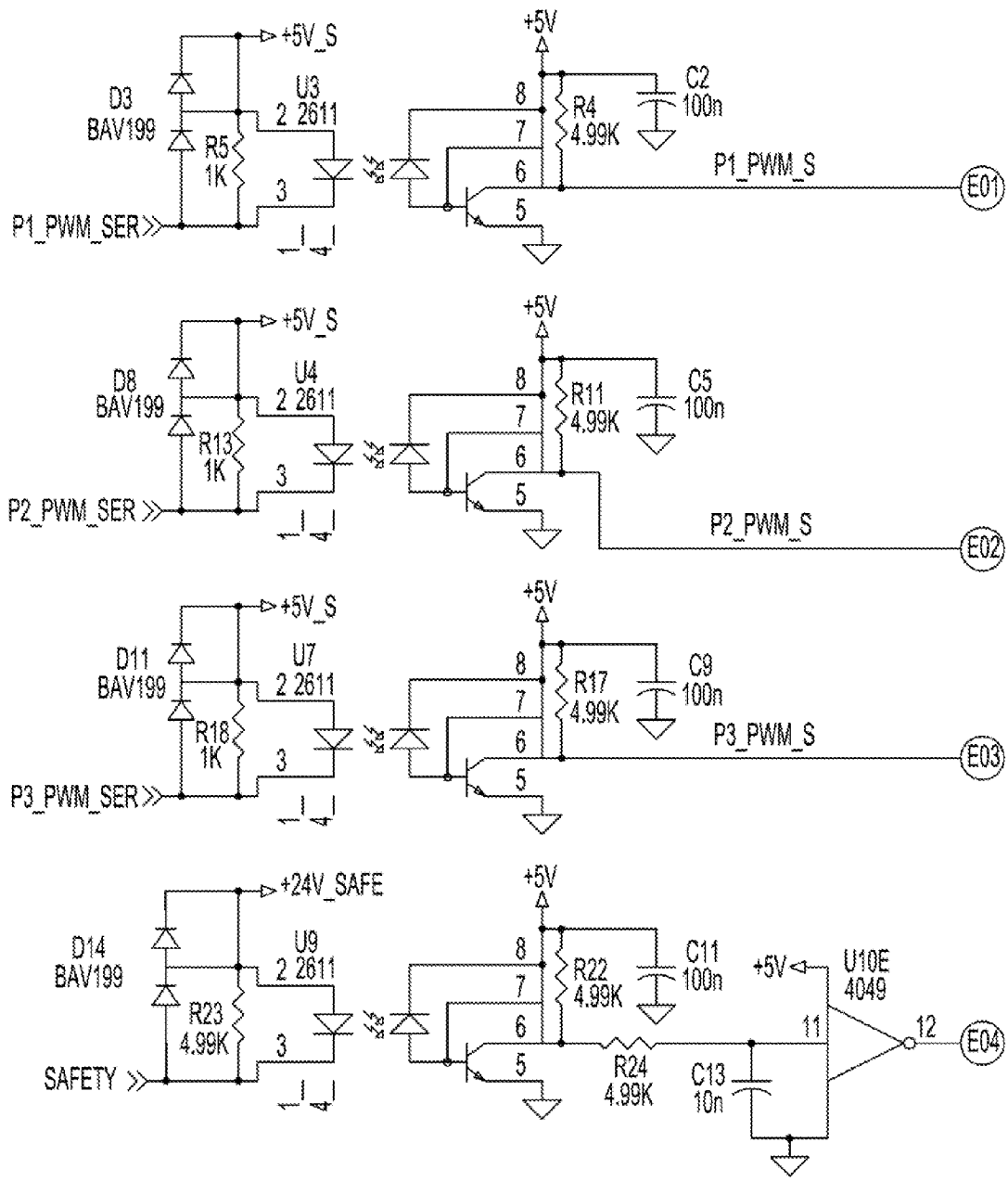
FIG. 8 is a schematic for a circuit to select and output the emergency control signal or the operational control signal.
Figure 8:
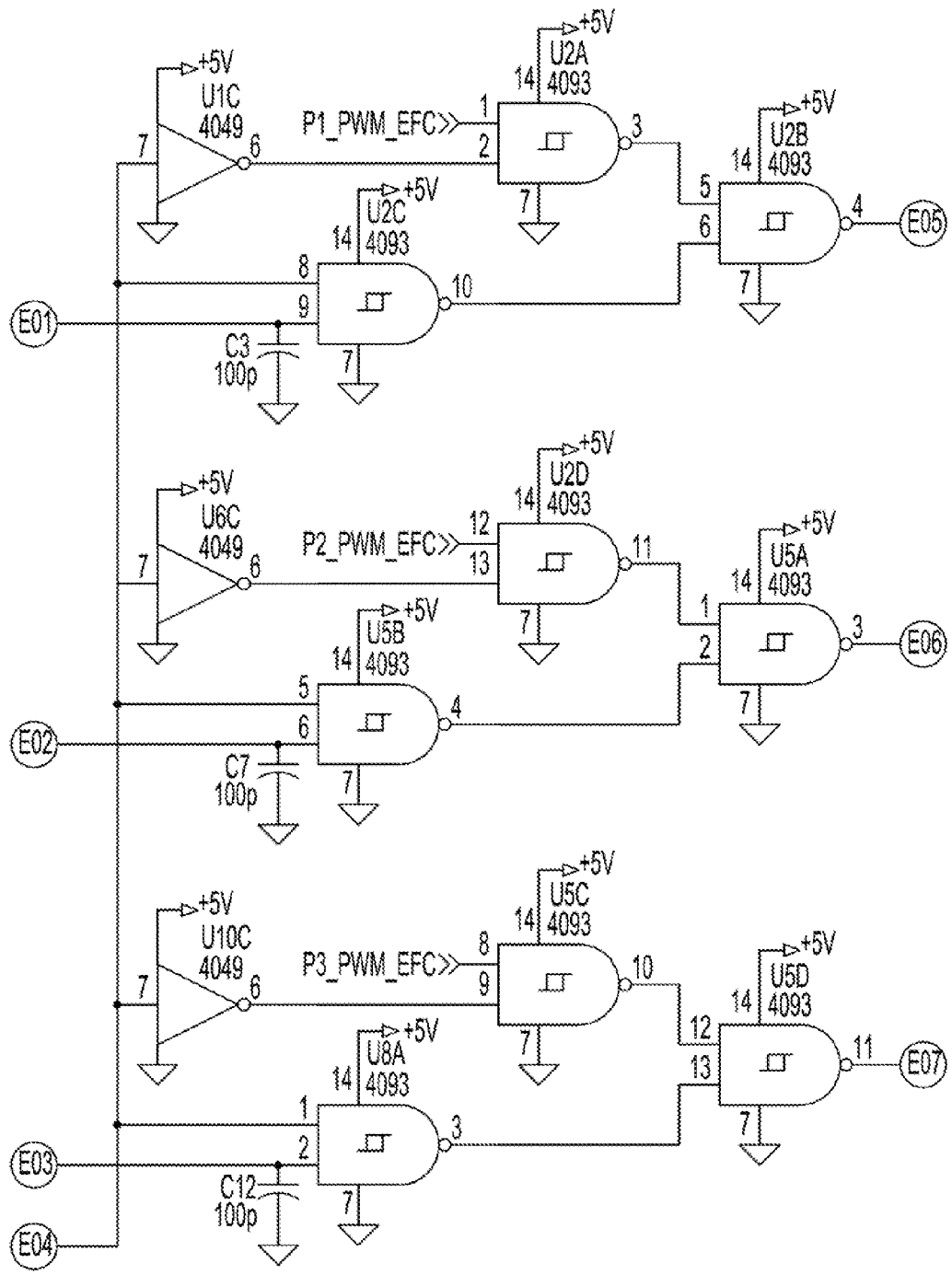
Figure 8:
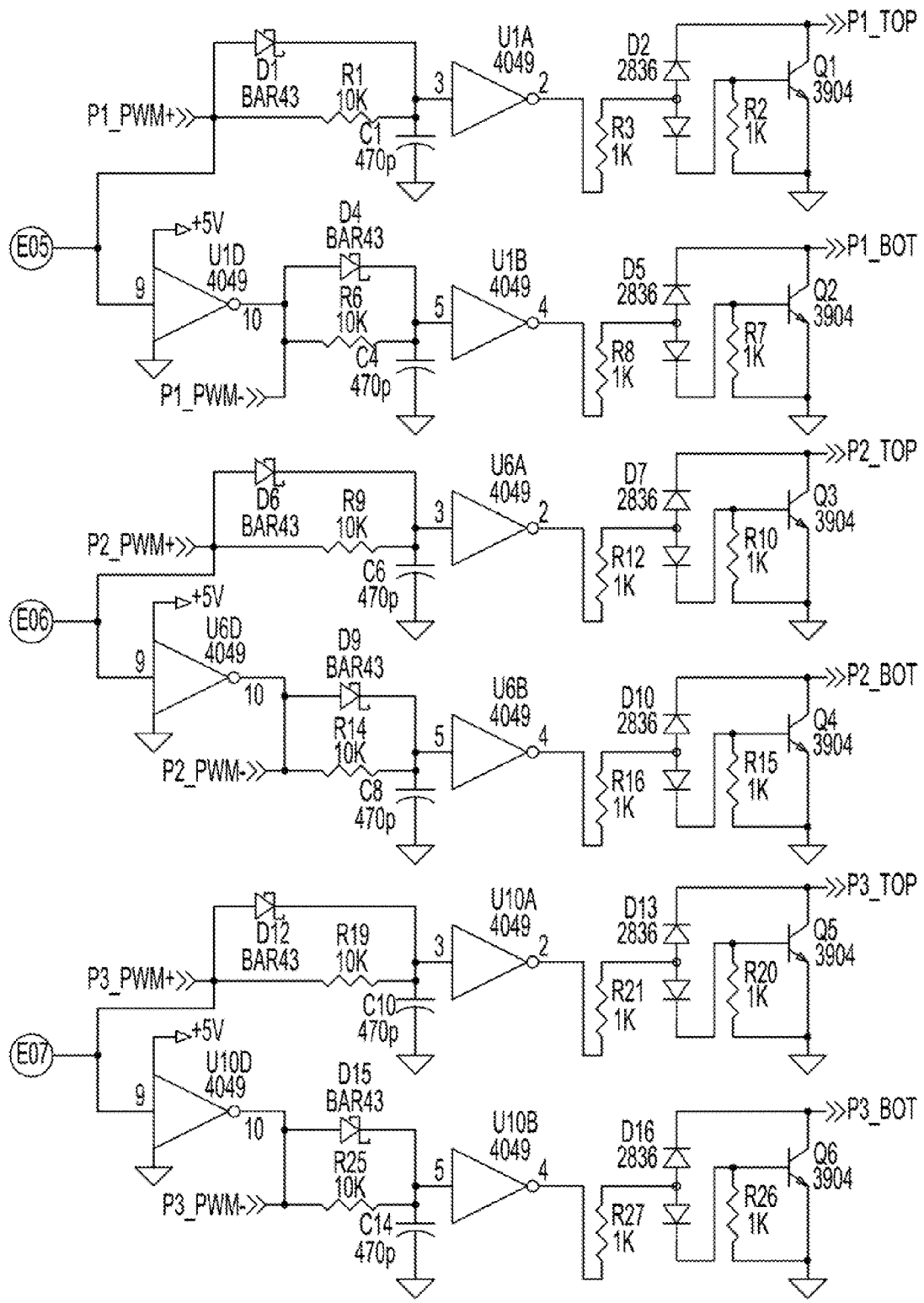

FIG. 8 is a schematic for circuit 600 to select and output the emergency control signal or the operational control signal. The following should be viewed in light of FIGS. 3 through 8. Circuit 600 is an exemplary circuit for generating gate drive signals for the armature output transistors by selecting signal 112 or signal 108, for example, nonemergency, servo control generated PWM signals or emergency operation PWM signals. That is, circuit 600 is for generating a signal transmitted from element 128 to element 130 regarding control of components in element 130. However, it should be understood that system 100 is not limited to the arrangement shown in FIG. 8 and that other circuit arrangements for generating gate drive signals are included in the spirit and scope of the claimed invention.

In one embodiment, the operation of element 126, for example, the control for the selection operation described supra, is based on the state of a safety loop of the blade pitch system. For example, the safety loop detects faults in a main system (not shown) in which system 100 is located. For example, if the safety loop detects a fault that necessitates shutting down the main system, a signal from the safety loop triggers element 102 if the blade is not in the feather position (the desired position for the blade in an emergency shutdown). That is, element 102 is activated to move the blade to the feather position. It should be understood that the logic circuits shown in figures can be implemented with one or more programmable logic devices.

The following is a brief description of the components shown in FIG. 8:

R4, R5, C2, C3, D3, U3: These components isolate the nonemergency, servo control generated reference PWM signal for phase 1 (P1_PWM_SER) from the emergency operation control circuitry and PWM selection logic;

R11, R13, C5, C7, D8, U4: These components isolate the nonemergency, servo control generated reference PWM signal for phase 2 (P2_PWM_SER) from the emergency operation control circuitry and PWM selection logic;

R17, R18, C9, C12, D11, U7: These components isolate the nonemergency, servo control generated reference PWM signal for phase 3 (P3_PWM_SER) from the emergency operation control circuitry and PWM selection logic;

R22, R23, R24, C11, C13, D14, U9: These components isolate the safety loop status signal (SAFETY) from the emergency operation control circuitry and PWM selection logic;

U1C, U2A, U2B, U2C, U10E: These logic components are used to select between the nonemergency, servo control generated PWM signal for phase 1 of the motor and the emergency operation generated PWM signal for phase 1 of the motor. This switching is controlled by the signal into U10E-11. If the safety loop state signal is showing the nonemergency state, then U10E-11 has a high logic level. This causes the nonemergency PWM source to be selected as the signal that gets passed through to the deadtime insertion circuitry. If the safety loop state signal is showing an emergency state, then the emergency operation circuitry generated PWM signal is selected as the signal that gets passed through to the deadtime insertion circuitry;

U2D, U5A, U5B, U6C, U10E: These logic components are used to select between the nonemergency, servo control generated PWM signal for phase 2 of the motor and the emergency operation generated PWM signal for phase 2 of the motor in the same fashion as that described for phase 1 in FIG. 7;

U5C, U5D, U8A, U10C, U10E: These logic components are used to select between the nonemergency, servo control generated PWM signal for phase 3 of the motor and the emergency operation generated PWM signal for phase 3 of the motor in the same fashion as that described for phase 1 in FIG. 7;

R1, R2, R3, R6, R7, R8, C1, C4, D1, D2, D4, D5, Q1, Q2, U1A, U1B, U1D—These components take the selected phase 1 PWM signal and split it into PWM signals that drive the top and bottom phase 1 armature output transistors gate drive circuits. The output transistors are connected in a totem pole fashion. Signal P1_TOP is used to control the top transistor of phase 1, and signal P1_BOT is used to control the bottom transistor of phase 1. P1_TOP and P1_BOT substantially have opposite polarities due to U1D inverting the signal for P1_BOT.

However, there is deadtime inserted into the P1_TOP and P1_BOT signals delaying when they turn on their associated transistor so that both transistors can be off at the same time before one is turned on. This prevents damaging currents from flowing through the two output transistors. To insert a delay in turning on the upper phase 1 transistor by signal P1_TOP, components R1 and C1 cause the falling edge of the signal into U1A-3 to be slowed down. This delay in reaching the lower threshold level on the input of U1A-3 causes a delay to the switching of the output on U1A-2. D1 prevents this delay from occurring on the rising edge into U1A-3 by permitting C1 to be charged quickly through D1. R6, C4, and D4 perform the same delay function for signal P1_BOT. The deadtime is inserted after the PWM signal source selection circuitry to prevent possible narrow PWM pulses generated during the switching process from placing the output transistors in an undesirable state;

R9, R10, R12, R14, R15, R16, C6, C8, D6, D7, D9, D10, Q3, Q4, U6A, U6B, U6D:

These components generate the control signals (P2_TOP and P2_BOT) for the phase 2 output transistor gate drives in an identical fashion as described for the phase 1 output transistor gate drive signals P1_TOP and P1_BOT; and R19, R20, R21, R25, R26, R27, C10, C14, D12, D13, D15, D16, Q5, Q6, U10A, U10B, U10D: These components generate the control signals (P3_TOP and P3_BOT) for the phase 3 output transistor gate drives in an identical fashion as described for the phase 1 output transistor gate drive signals P1_TOP and P1_BOT.

Figure 9:
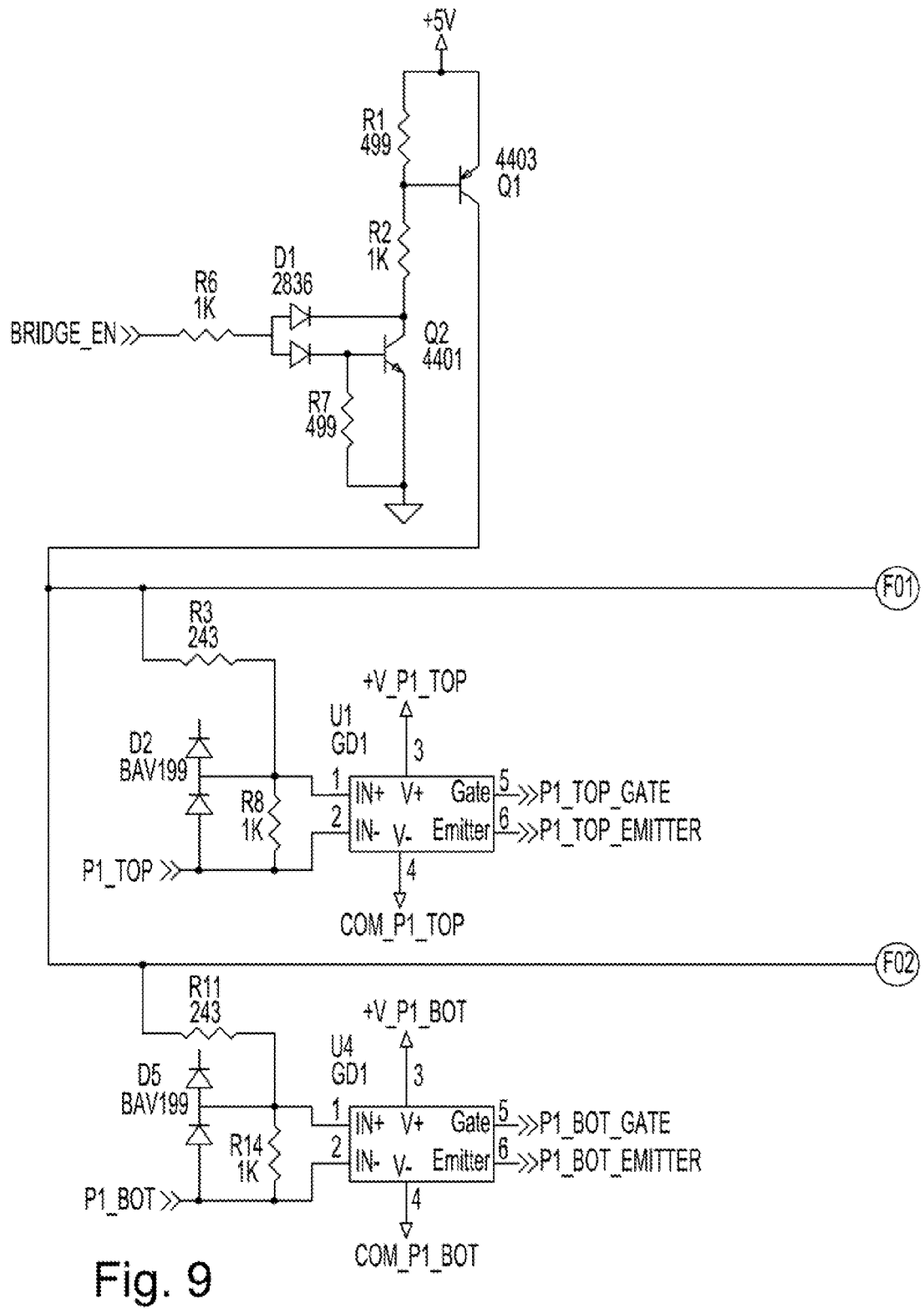
FIG. 9 is a schematic for a circuit to use the outputted emergency control signal or the operational control system to provide power to the motor.
Figure 9:
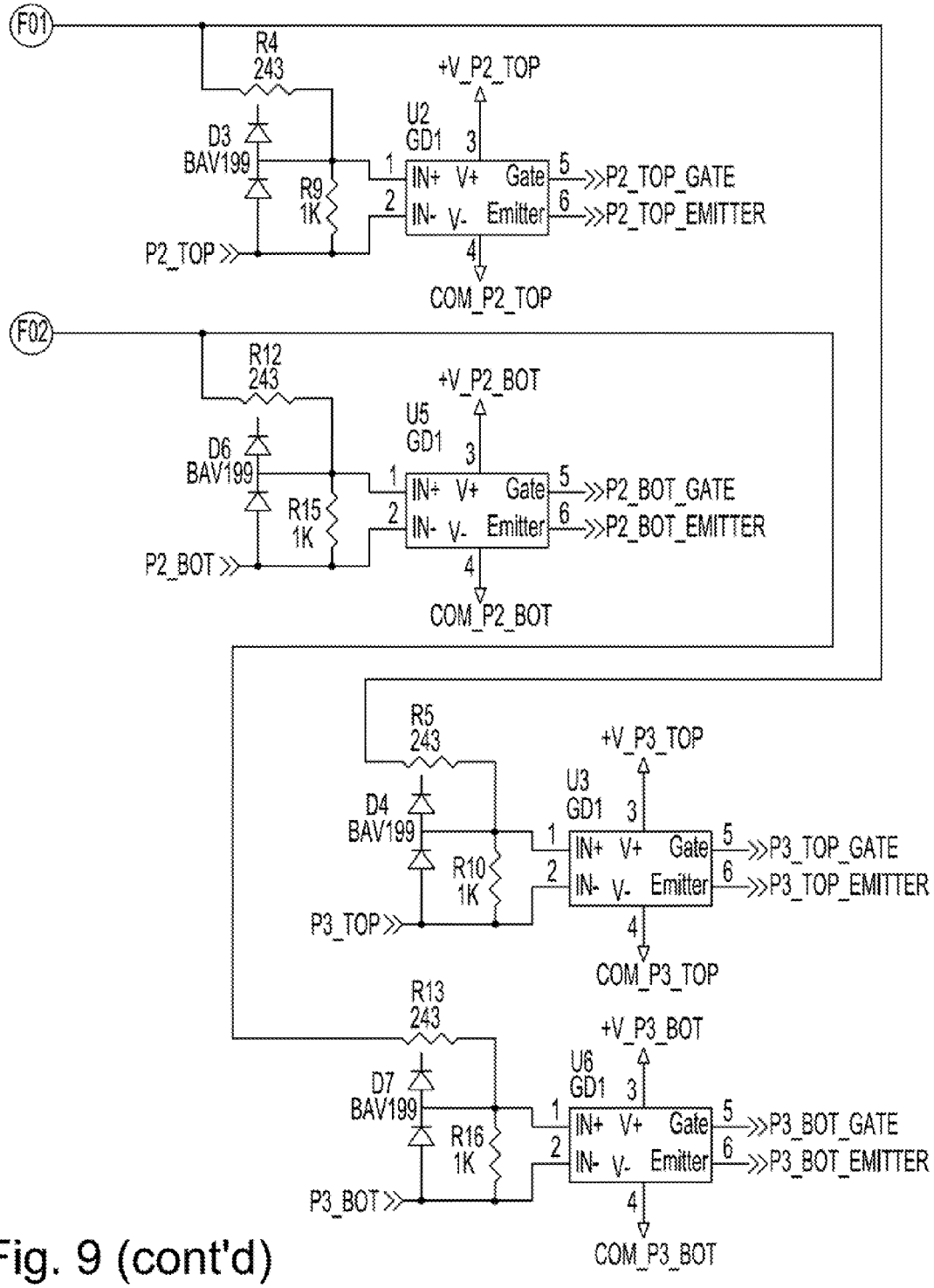

FIG. 9 is a schematic for circuit 700 to use the outputted emergency control signal or the operational control system to provide power to the motor. The following should be viewed in light of FIGS. 3 through 9. Circuit 700 is an exemplary circuit for generating signals to drive power devices in element 130. For example, circuit 700 generates signals to drive gates of armature output transistors based on the states of the PWM gate drive input signals and the output bridge enable signal. However, it should be understood that system 100 is not limited to the arrangement shown in FIG. 9 and that other circuit arrangements for generating drive signals are included in the spirit and scope of the claimed invention. In one embodiment, an output transistor only is gated on if its associated PWM gate drive input signal is low and the bridge enable signal (BRIDGE_EN) is driven high.

The following is a brief description of the components shown in FIG. 9:

R1, R2, R6, R7, D1, Q1, Q2: These components are used to turn off all output transistors by turning Q1 off by setting the bridge enable signal BRIDGE_EN to a low level. With Q1 off, the +5V source is disconnected from the individual gate drive circuits. With Q1 turned on, each gate drive circuit is controlled by its associated gate drive signal;

R3, R8, D2, Q1, U1: These components are used to directly drive the gates of the top transistor for the phase 1 armature output stage. The gate drive output on U1-5 (P1_TOP_GATE) rises to a sufficient level with respect to U1-6 (P1_TOP_EMITTER) that the associated armature output transistor turns on if the input signal on U1-2 (P1_TOP) is driven low and the BRIDGE_EN signal is turning on Q1. The gate drive output on U1-5 (P1_TOP_GATE) falls to a sufficient level with respect to U1-6 (P1_TOP_EMITTER) that the associated armature output transistor turns off if the input signal on U1-2 (P1_TOP) is driven high or the BRIDGE_EN signal is turning off Q1;

R4, R9, D3, Q1, U2: These components are used to directly drive the gates of the top transistor for the phase 2 armature output stage in the same fashion as that for the top transistor of phase 1 armature;

R5, R10, D4, Q1, U3: These components are used to directly drive the gates of the top transistor for the phase 3 armature output stage in the same fashion as that for the top transistor of phase 1 armature;

R11, R14, D5, Q1, U4: These components are used to directly drive the gates of the bottom transistor for the phase 1 armature output stage in the same fashion as that for the top transistor of phase 1 armature;

R12, R15, D6, Q1, U5: These components are used to directly drive the gates of the bottom transistor for the phase 2 armature output stage in the same fashion as that for the top transistor of phase 1 armature; and R13, R16, D7, Q1, U6: These components are used to directly drive the gates of the bottom transistor for the phase 3 armature output stage in the same fashion as that for the top transistor of phase 1 armature.

Figure 10:
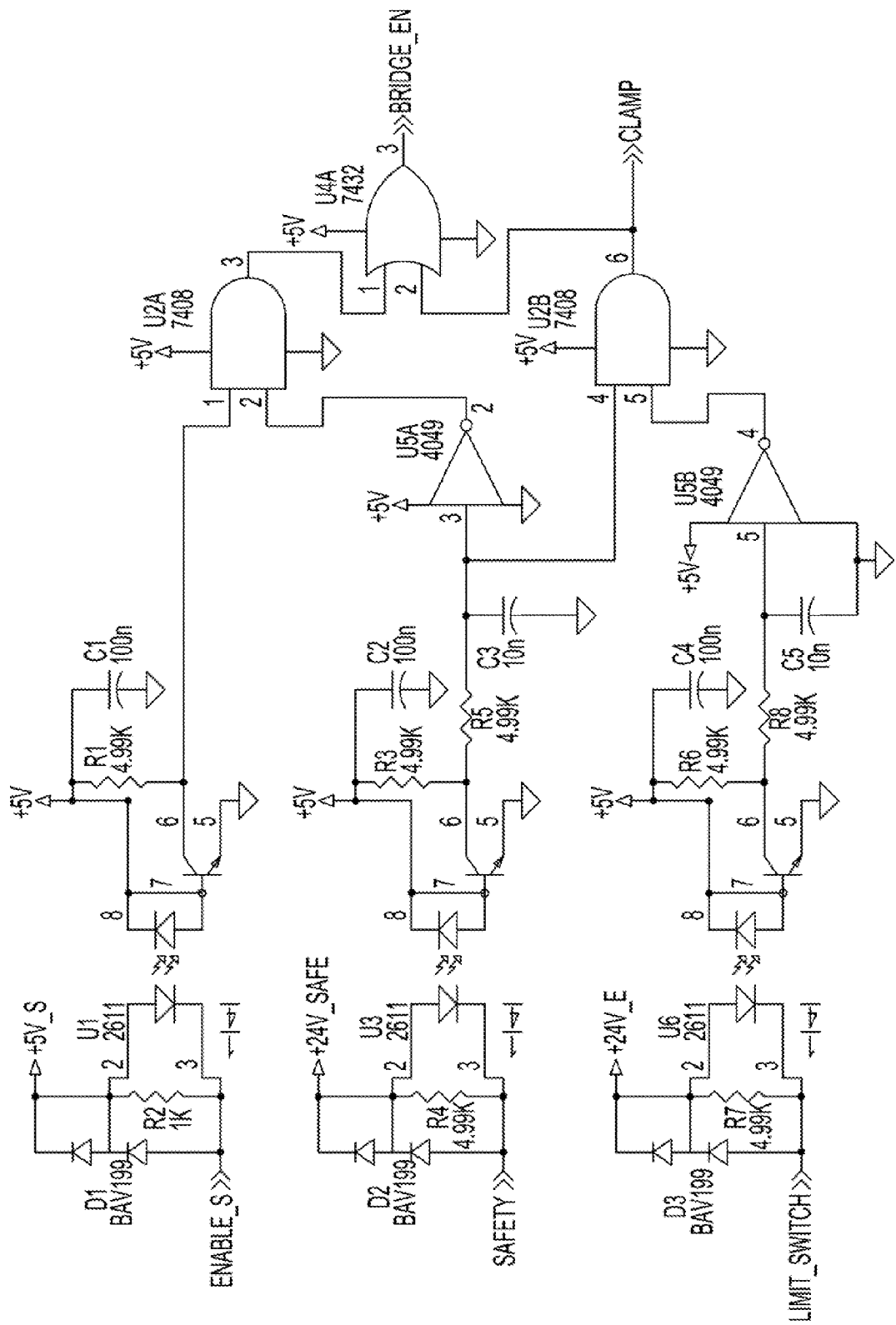
FIG. 10 is a schematic for a circuit to generate one or more disable control signals to disable the output stage element; and, FIG. 11 is a schematic block diagram of a present invention control system for a turbine blade with fully redundant emergency control.

FIG. 10 is a schematic for circuit 800 to generate one or more disable control signals to disable the output stage element. The following should be viewed in light of FIGS. 3 through 10. Circuit 800 is an exemplary circuit for generating a disable signal for element 106. However, it should be understood that system 100 is not limited to the arrangement shown in FIG. 10 and that other circuit arrangements for generating a feedback signal are included in the spirit and scope of the claimed invention. In one embodiment, circuit 800 selects the source of the bridge enable signal (BRIDGE_EN) and generates the control signal CLAMP which is used to clamp velocity loop and current loop errors to zero volts and cause the emergency operation PWM signals to be 50% duty cycle. For example, when the blade reaches the feather position.

The following is a brief description of the components shown in FIG. 10:

R1, R2, C1, D1, U1: These components isolate the nonemergency, servo control operation bridge enable signal (ENABLE_S) from the emergency operation control circuitry and bridge enable selection logic;

R3, R4, R5, C2, C3, D2, U3: These components isolate the safety loop status signal (SAFETY) from the emergency operation control circuitry and bridge enable selection logic;

R6, R7, R8, C4, C5, D3, U6: These components isolate an emergency operation limit switch signal (LIMIT_SWITCH) from the emergency operation control circuitry and bridge enable selection logic. The LIMIT_SWITCH signal is generated from a limit switch mounted on the turbine blade and provides a status indication when the blade has reached the feather position at which point the emergency movement of the blade is no longer required as the blade is in its safe feather position;

U2A, U2B, U4A, U5A, U5B: These components provide the logic for selecting the source of the bridge enable signal BRIDGE_EN. The BRIDGE_EN signal is a single signal that can be used to disable all output transistor gate drive signals and turn off all the armature output transistors. This is accomplished when BRIDGE_EN is low. When BRIDGE_EN is high, it enables the output transistors to be controlled by the individual gate drive signals for the output transistors.

Although these logic components are shown as discrete elements, it should be understood that the functions of these components can be implemented in a programmable logic device (not shown).

The BRIDGE_EN signal is sourced by the ENABLE_S signal if the safety loop of the pitch system is in the nonemergency state by the signal SAFETY being driven low with respect to +24VSAFE. If the pitch system is in an emergency state, then the source for BRIDGE_EN is from the signal LIMIT_SWITCH; and U2B, U5B: These components provide the logic for generating the clamping signal CLAMP. Although these logic components are shown as discrete elements, it should be understood that the functions of these components can be implemented in a programmable logic device (not shown). The CLAMP signal is used to make the velocity loop and current loop errors equal to zero volts as well as reset any voltage stored on integration capacitors. Also, the CLAMP signal sets all emergency circuit generated reference PWM signals to 50% duty cycle. Circuitry can be added that monitors these PWM signals in the nonemergency state to help detect if there is a malfunction of the emergency circuitry before the circuitry is activated, and if there is a malfunction detected, then the nonemergency, servo operation circuitry can be used to pitch the blades to the feather position to ensure a proper shutdown of the turbine.

Figure 11:
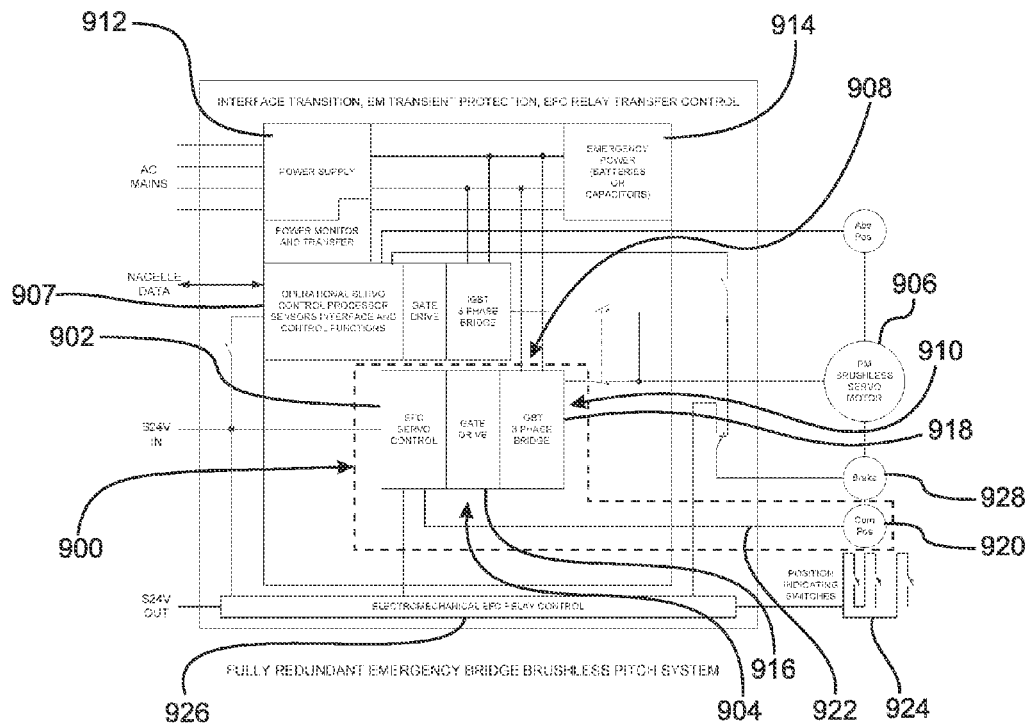

FIG. 11 is a schematic block diagram of present invention control system 900 for a turbine blade with fully redundant emergency control. System 900 includes emergency control element 902 and output stage element 904. Element 902 is for generating and outputting an emergency control signal for emergency operation of motor 906. The motor is for controlling the pitch of a blade (not shown) connected to the motor. In one embodiment, the motor is a brushless AC motor. In one embodiment system 900 includes the implementation of a brushless pitch system using a fully redundant section of power switches in a three phase power bridge format. In this approach, as with the DC pitch system, electromechanical control is (among the techniques) used for control of emergency feather operation. By providing a fully redundant power delivery and control for emergency operation, system 900 delivers nearly all the safety advantages associated with a DC motor implementation, while providing the performance and service duration advantages associated with an AC motor control system. A separate redundant motor position feedback device is employed to enhance reliability, avoid software decoding, and permit simple reliable circuit designs.

Element 907 is for generating and outputting an operational control signal for non-emergency operation of motor 906. Elements 902 and 907 receive an emergency status signal, which indicates whether operation in emergency or non-emergency mode is required. Any means known in the art can be used for the status signal, for example, voltage S24V IN is monitored by elements 902 and 907. In one embodiment, voltage on the line indicates non-emergency operation and a lack of voltage or voltage below a predetermined threshold indicates operation in emergency mode. For example, for voltage S24V IN below the threshold noted above, system 900 is activated to operate the motor and for voltage S24V IN above the threshold noted above, element 907 controls the motor. Any condition known in the art for system 900 or for a turbine (not shown) including system 900 can be monitored or detected to generate the emergency status signal.

Element 904 includes means, for example, terminals 908, for receiving power for operation of the motor and means, for example, terminals 910, for providing the received power to the motor during emergency operation. Any power receiving and transmitting means known in the art can be used. Element 904 can receive and transmit power from any power sources known in the art, for example, power supply 912 for normal operation and emergency power supply 914, which can, for example, be a battery or capacitor power supply.

In one embodiment, the output stage element includes output stage control element 916 and output stage element 918. Element 916 is for receiving the emergency control signal and outputting appropriate control signals to element 918. Element 918 is for receiving the signals and includes the means for receiving power and the means for providing the received power.

In one embodiment, system 900 includes feedback element 920 for sensing a position of the rotor, for generating a feedback signal according to the sensed position, and for transmitting the feedback signal. The emergency control element is for receiving the feedback signal, for example, on line 922, and generating the emergency control signal responsive to the feedback signal. That is, the emergency control signal is generated to account for the position of the rotor. Alternately stated, element 920 provides rotor angle information used to electrically commutate electrical current for the motor. In one embodiment, the feedback signal is used to control the movement of the blade toward the feather position, and limit switch 924 is used to determine when the blade has reached the feather position. A signal from the limit switch is then used to stop the motor rotation. For example, a signal is transmitted from the limit switch to relay control unit 926 when the blade reaches the feather position and unit 926 passes the signal on to element 902. Unit 926 also transmits a signal to brake 928 to brake the motor at the feather position. In one embodiment, when the blade reaches the desired terminal position, data in the feedback signal describes this position and element 902 determines that the blade no longer needs to be rotated and generates the emergency control signal to cease rotation of the blade.

It should be understood that system 900 can be operated without feedback sensor 920. For example, if emergency operation is enabled for system 900, element 902 can generate the emergency control signal to drive the blade to the feathered position, regardless of the position of the blade when the emergency control signal is generated. In this case, element 918 generates the desired motor current and the motor eventually synchronizes with the desired current. In another case, data regarding a position of the blade can be obtained directly from the motor and used to generate the emergency control signal.

In one embodiment, element 920 is a resolver feedback device, an electromechanical device that does not contain any active components. Due to the lack of active components, the resolver device is extremely rugged and the components in the resolver device are much more able than active components to resist failure in the presence of electrical disturbances, for example, lightning strikes, around the motor. For example, a resolver relies only on mechanical operation, for example, a resolver contains wound coils and is very rugged and immune to failure from electrical disturbances or other coupled transient events. Also, a resolver has a much broader temperature range of operation than typical feedback devices containing electronics. Therefore, in the event of thermal problems with the motor, the resolver is less likely to suffer temperature-related problems and is able to continue to provide feedback data.

It should be understood that other position feedback devices could be used and are included in the spirit and scope of the claimed invention. For example, a Hall feedback device can be used. For example, in one embodiment (not shown), a Hall feedback device is used with a six step current modulation scheme.

The following should be viewed in light of FIG. 11. The following describes a present invention method for controlling a turbine blade. Although the method is presented as a sequence of steps for clarity, no order should be inferred from the sequence unless explicitly stated. A first step generates and outputs, in response to an emergency status signal and using an operational control element, an operational control signal for non-emergency operation of a motor for controlling pitch of the turbine blade; a second step, in an operational output stage element: receives the operational control signal; a third step receives power for non-emergency operation of the motor; and, a fourth step provides the received power for non-emergency operation of the motor to the motor according to the operational control signal. A fifth step generates and outputs, in response to the emergency status signal and using an emergency control element, separate from and different from the operational control element, an emergency control signal for emergency operation of the motor; in an emergency output stage element, a sixth step receives the emergency control signal; a seventh step receives power for emergency operation of the motor; and an eighth step provides the received power for emergency operation of the motor to the motor according to the emergency control signal.

In one embodiment, the operational output stage element includes an operational output stage control element and an operational output stage element, receiving the operational control signal includes using the operational output stage control element to receive, and receiving power for non-emergency operation of the motor and providing the received power for non-emergency operation of the motor includes using the operational output stage element to receive and provide. In one embodiment, the emergency output stage element includes an emergency output stage control element and an emergency output stage element, receiving the emergency control signal includes using the emergency output stage control element to receive, and receiving power for emergency operation of the motor and providing the received power for emergency operation of the motor includes using the emergency output stage element to receive and provide In one embodiment, a step senses, using a feedback element, a position of the motor; another step generates, using the feedback element, a feedback signal according to the sensed position; a further step transmits, using the feedback element, the feedback signal; and yet another step receives, using the emergency control element, the feedback signal and generating the emergency control signal includes generating responsive to the feedback signal.

Thus, it is seen that the objects of the invention are efficiently obtained, although changes and modifications to the invention should be readily apparent to those having ordinary skill in the art, without departing from the spirit or scope of the invention as claimed. Although the invention is described by reference to a specific preferred embodiment, it is clear that variations can be made without departing from the scope or spirit of the invention as claimed.

What we claim is:

1. A control system for a turbine blade, comprising:
   an emergency power supply;
   an operational control element for generating and outputting an operational control signal, the operational control signal for non-emergency operation of a motor for controlling pitch of the turbine blade;
   an emergency control element, separate from and different from the operational control element, for generating and outputting an emergency control signal for emergency operation of the motor; and,
   an output stage element for receiving the operational and emergency control signals and for selecting one of the operational or emergency control signals and with a means for receiving power for operation of the motor and with a means for providing the received power to the motor according to the selected operational or emergency control signal, wherein the means for receiving power is arranged to receive emergency power from the emergency power supply without the emergency power passing through the emergency control element.

2. The control system of claim 1 wherein the output stage element further comprises:
   an output stage control element for receiving the operational and emergency control signals, for selecting one of the operational or emergency control signals, and for outputting the selected operational or emergency control signal; and,
   an output stage element for receiving the outputted operational or emergency control signal and including the means for receiving power and the means for providing the received power.

3. The control system of claim 1 further comprising a feedback element for sensing a position of the motor, for generating a feedback signal according to the sensed position, and for transmitting the feedback signal and wherein the emergency control element is for receiving the feedback signal and generating the emergency control signal responsive to the feedback signal.

4. A control system for a turbine blade, comprising:
   an emergency power supply;
   an operational control element for generating and outputting an operational control signal, the operational control signal for non-emergency operation of a motor for controlling pitch of the turbine blade;
   a feedback element for sensing a position of the blade, for generating a feedback signal according to the sensed position, and for transmitting the feedback signal;
   an emergency control element, separate from and different from the operational control element, for:
      receiving the motor feedback signal;
      generating an emergency control signal, responsive to the feedback signal, for emergency operation of the motor; and,
      generating and outputting an emergency control signal;
   a first output stage control element for receiving the operational and emergency control signals, for selecting one of the operational or emergency control signals, and for outputting the selected operational or emergency control signal; and,
   a second output stage element for receiving the selected operational or emergency control signal and including a means for receiving power from the emergency power supply, without the emergency power passing through the emergency control element, for operation of the motor and a means for providing the received power to the motor according to the selected operational or emergency control signal.

5. A method for controlling a turbine blade, comprising:
   generating and outputting, using an operational control element, an operational control signal for non-emergency operation of a motor for controlling pitch of the turbine blade;
   generating and outputting, using an emergency control element, separate from and different from the operational control element, an emergency control signal for emergency operation of the motor; and,
   in an output stage element:
      receiving the operational and emergency control signals;
      selecting one of the operational or emergency control signals;
      receiving power for operation of the motor; and,
      providing the received power to the motor according to the selected operational or emergency control signal, wherein receiving power for operation of the motor includes:
         receiving power for non-emergency operation through the operational control element; and,
         receiving power for emergency operation:
            from an emergency power supply; and,
            without the emergency power passing through the emergency control element.

6. The method of claim 5 wherein the output stage element further comprises an output stage control element and an output stage element, wherein receiving and selecting the operational and emergency control signals inlcudes using the output stage control element to receive and select, and wherein receiving power for operation of the motor and providing the received power includes using the output stage element to receive and provide.

7. The method of claim 5 further comprising:
sensing, using a feedback element, a position of the motor;
generating, using the feedback element, a feedback signal according to the sensed position;
transmitting, using the feedback element, the feedback signal; and,
receiving, using the emergency control element, the feedback signal and wherein generating the emergency control signal includes generating responsive to the feedback signal.

8. A control system for a turbine blade, comprising:
an operational control element for generating and outputting an operational control signal, the operational control signal for non-emergency operation of a motor for controlling pitch of the turbine blade;
an emergency control element, separate from and different from the operational control element, for generating and outputting an emergency control signal for emergency operation of the motor;
a first output stage element including:
a first operational output stage element for receiving the operational control signal and with a first means for receiving power for non-emergency operation of the motor and with a first means for providing the received power to the motor according to the operational control signal; and,
a first emergency output stage element for receiving the emergency control signal and with a first means for receiving power for emergency operation of the motor and with a first means for providing the received power to the motor according to the emergency control signal; and,
a second output stage element including:
a second operational output stage element for receiving the operational control signal and with a second means for receiving power for non-emergency operation of the motor and with a second means for providing the received power to the motor according to the operational control signal; and,
a second emergency output stage element for receiving the emergency control signal and with a second means for receiving power for emergency operation of the motor and with a second means for providing the received power to the motor according to the emergency control signal.

9. The control system of claim 8,
wherein the first operational output stage element further comprises:
an operational output stage control element for receiving the operational control signal; and,
an output stage element including the means for receiving power for non-emergency operation of a motor and the means for providing the received power for non-emergency operation of a motor; or,
wherein the first emergency output stage element further comprises:
an emergency output stage control element for receiving the emergency control signal; and,
an emergency output stage element including the means for receiving power for emergency operation of a motor and the means for providing the received power for emergency operation of a motor.

10. The control system of claim 8 further comprising a feedback element for sensing a position of the motor, for generating a feedback signal according to the sensed position, and for transmitting the feedback signal and wherein the emergency control element is for receiving the feedback signal and generating the emergency control signal responsive to the feedback signal.

11. A method for controlling a turbine blade, comprising:
generating and outputting, in response to an emergency status signal and using an operational control element, an operational control signal for non-emergency operation of a motor for controlling pitch of the turbine blade;
in a first operational output stage element:
receiving the operational control signal;
receiving power for non-emergency operation of the motor; and,
providing the received power for non-emergency operation of the motor to the motor according to the operational control signal;
in a second operational output stage element:
receiving the operational control signal;
receiving power for non-emergency operation of the motor; and,
providing the received power for non-emergency operation of the motor to the motor according to the operational control signal;
generating and outputting, in response to the emergency status signal and using an emergency control element, separate from and different from the operational control element, an emergency control signal for emergency operation of the motor;
in a first emergency output stage element:
receiving the emergency control signal;
receiving power for emergency operation of the motor without the power passing through the emergency control element; and,
providing the received power for emergency operation of the motor to the motor according to the emergency control signal; and,
in a second emergency output stage element:
receiving the emergency control signal;
receiving power for emergency operation of the motor without the power passing through the emergency control element; and,
providing the received power for emergency operation of the motor to the motor according to the emergency control signal.

12. The method of claim 11 wherein the first and second operational output stage elements further comprise respective operational output stage control elements and respective operational output stage elements, wherein receiving the operational control signal includes using the respective operational output stage control elements to receive, and wherein receiving power for non-emergency operation of the motor and providing the received power for non-emergency operation of the motor includes using one of the respective operational output stage elements to receive and provide; or, wherein the first and second emergency output stage elements further comprise respective emergency output stage control elements and respective emergency output stage elements, wherein receiving the emergency control signal includes using the respective emergency output stage control elements to receive, and wherein receiving power for emergency operation of the motor and providing the received power for emergency operation of the motor includes using one of the respective emergency output stage elements to receive and provide.

13. The method of claim 11 further comprising:

sensing, using a feedback element, a position of the motor;

generating, using the feedback element, a feedback signal according to the sensed position;

transmitting, using the feedback element, the feedback signal; and, receiving, using the emergency control element, the feedback signal and wherein generating the emergency control signal includes generating responsive to the feedback signal.

* * * * *